US007085819B2

(12) United States Patent
Bright et al.

(10) Patent No.: US 7,085,819 B2
(45) Date of Patent: Aug. 1, 2006

(54) SYSTEM AND METHOD FOR DISTRIBUTED NETWORK DATA STORAGE

(75) Inventors: Jonathan D. Bright, San Francisco, CA (US); John A. Chandy, Burlingame, CA (US); Ericson G. Fordelon, Castro Valley, CA (US); Matthew B. Ryan, San Francisco, CA (US)

(73) Assignee: Sigma Storage, New York, NY (US)

( * ) Notice: Subject to any disclaimer, the term of this patent is extended or adjusted under 35 U.S.C. 154(b) by 434 days.

(21) Appl. No.: 10/038,049

(22) Filed: Dec. 20, 2001

(65) Prior Publication Data

US 2003/0120723 A1 Jun. 26, 2003

(51) Int. Cl.
*G06F 15/16* (2006.01)

(52) U.S. Cl. .................................................... 709/217

(58) Field of Classification Search ................ 709/203, 709/213–219, 223, 224; 714/100, 4–7; 711/203, 711/205

See application file for complete search history.

(56) References Cited

U.S. PATENT DOCUMENTS 5,815,649 A * 9/1998 Utter et al. .................... 714/6
6,029,168 A * 2/2000 Frey ............................ 707/10
6,122,754 A * 9/2000 Litwin et al. .................. 714/4
6,351,838 B1 * 2/2002 Amelia ....................... 714/770
6,556,998 B1 * 4/2003 Mukherjee et al. ........... 707/10
6,826,711 B1 * 11/2004 Moulton et al. ............... 714/6
6,871,295 B1 * 3/2005 Ulrich et al. .................. 714/6
6,889,249 B1 * 5/2005 Miloushev et al. ......... 709/213
6,895,467 B1 * 5/2005 Lubbers et al. ............. 711/114
6,898,634 B1 * 5/2005 Collins et al. .............. 709/226
2003/0033327 A1 * 2/2003 Mandal et al. .............. 707/204
2003/0105829 A1 * 6/2003 Hayward .................... 709/214

OTHER PUBLICATIONS

Anderson et al.; Serverless Network File Systems; ACM Feb. 1996.*
Brinkmann et al.; Efficient, Distributed Data Placement Strategies for Storage Area Networks; 2000.*
Chen et al.; An Effective Write Policy for Software Coherence Schemes; IEEE 1992.*
Jouppi; Cache Write Policies and Performance; IEEE 1993.*

* cited by examiner

*Primary Examiner*—Krisna Lim
*Assistant Examiner*—Sean Reilly
(74) *Attorney, Agent, or Firm*—Henneman & Associates, PLC; Larry E. Henneman, Jr.

(57) ABSTRACT

A distributed network data storage method includes receiving a data set from a client, defining a virtual device to include a plurality of device portions each on one of a plurality of network servers, parsing the data set into a plurality of data portions, and writing each of the data portions to a corresponding one of the virtual device portions. Methods are also disclosed for securely writing data to the virtual devices, and for identifying and reconstructing corrupt data. A system for implementing the data storage/retrieval method includes a plurality of network servers, each running a distributed RAID server application. The servers communicate with clients via a first network, and with each other via a second network.

123 Claims, 15 Drawing Sheets

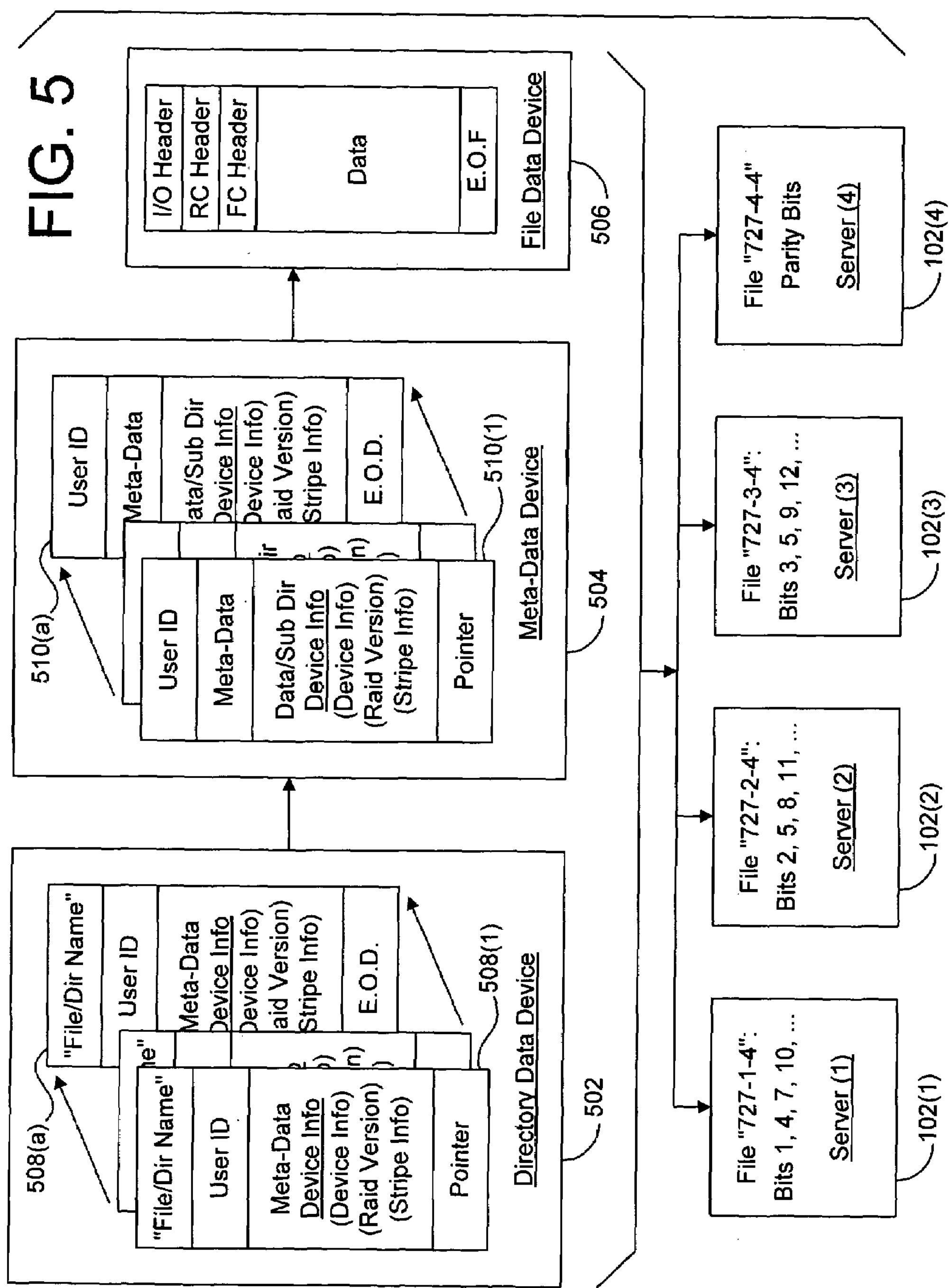
FIG. 5
I/O Header
RC Header
FC Header
Data
E.O.F
File Data Device
506
User ID
Meta-Data
Data/Sub Dir
Device Info
(Device Info)
(Raid Version)
(Stripe Info)
Pointer
E.O.D.
510(a)
510(1)
Meta-Data Device
504
"File/Dir Name"
User ID
Meta-Data
Device Info
(Device Info)
(Raid Version)
(Stripe Info)
Pointer
E.O.D.
508(a)
508(1)
Directory Data Device
502
File "727-1-4":
Bits 1, 4, 7, 10, ...
Server (1)
102(1)
File "727-2-4":
Bits 2, 5, 8, 11, ...
Server (2)
102(2)
File "727-3-4":
Bits 3, 5, 9, 12, ...
Server (3)
102(3)
File "727-4-4"
Parity Bits
Server (4)
102(4)

SYSTEM AND METHOD FOR DISTRIBUTED NETWORK DATA STORAGE

BACKGROUND OF THE INVENTION

1. Field of the Invention

This invention relates generally to electronic data storage, and more particularly to a novel system and method for storing data on a plurality of network servers.

2. Description of the Background Art

Redundant Array of Independent (or Inexpensive) Disks (RAID) is a data storage scheme that was developed to provide an improvement in speed, reliability, and capacity, over single disk systems. A RAID system typically includes multiple hard disks that are used, and appear to the user, as a single disk.

RAID increases reliability by providing data redundancy. In one type of RAID (mirroring), a complete copy of the data is written to two or more separate disks. In another type of RAID (parity), parity data is included on one of the disks, so that if any of the other disks are damaged, the lost data can be recreated by comparing the data on the remaining disks with the parity data.

RAID increases speed by providing parallel access to multiple disks. By distributing portions of a file/data across multiple disks (striping), the data can be written or read much faster. In particular, it takes less time to read/write several small portions simultaneously from/to several disks than it does to read/write the entire file from/to a single disk.

Although RAID systems provide improvements over previous single disk data storage systems, RAID systems still have significant limitations. For example, the disk arrays are generally embodied in a single server, and are therefore susceptible to machine level failures (e.g., power failure, network connection failure, etc.). Additionally, it is difficult to incrementally increase the storage capacity of a RAID server, because an additional single disk cannot generally be added to a RAID system. Further, RAID systems are typically connected to a network via a single physical network connection, thereby limiting the data transfer bandwidth to/from the server. Additionally, single machine systems have practical limits on the number of processing units that can be implemented (e.g., to run client processes, parity calculations, etc.), thereby limiting the number of clients that can be effectively served.

What is needed, therefore, is a data storage system and method that facilitates data storage and retrieval in the event of a machine level failure. What is also needed is a data storage system and method that ensures data integrity, in the event of a machine level failure. What is also needed is a data storage system whose storage capacity can be incrementally augmented with additional single storage units (e.g., single hard disks, servers, etc.). What is also needed is a data storage system that provides an increased data transfer bandwidth between clients and the storage system.

SUMMARY

The present invention overcomes the problems associated with the prior art by providing a distributed network data storage and retrieval system and method. The invention facilitates writing data to and reading data from a network server cluster, even when one of the servers encounters a machine level failure. The invention further facilitates the incremental augmentation of the systems storage capacity. The invention further ensures data integrity, even in the event of a machine level failure, and provides increased data transfer bandwidth between clients and the storage system as compared to prior art systems. It should be understood that various embodiments of the present invention achieve some, but not necessarily all, of the foregoing advantages. Therefore, none of these individual advantages are essential elements of the present invention, and should not be interpreted as limitations.

A distributed network data storage method includes receiving a data set from a client, defining a virtual device to include device portions on a plurality of network servers, parsing the data set into a plurality of data portions, and writing each of the data portions to a corresponding one of the device portions. In a particular embodiment, the data is received from the client via a first network, and the data is written to the virtual device via a second network. Any type of data, including client data files, directory data files, and meta-data files can be stored in the virtual devices.

According to one particular storage scheme, the system includes a large number of virtual devices, and no more than one user data file is written to each virtual device. According to a more particular scheme, no more than one directory data file is written to each virtual device. According to an even more particular scheme, no more than one meta-data file is written to each virtual device. Optionally, no more than one type of data is written to each virtual data device.

One method of defining the virtual device includes determining the number of data portions into which the data set is to be parsed, selecting a number of servers from the plurality of servers (one server for each data portion), and defining a data portion file for each selected server to store a corresponding one of the data portions. Optionally, the number of data portions into which the data set is parsed depends on the type of data in the data set. In a particular method, the step of defining the virtual device includes defining one of the device portions to include parity data, and the step of parsing the data set includes generating parity data from the parsed data portions.

Each data portion file is assigned a name. In one particular method, the name includes an identifier uniquely identifying the virtual device, a file number uniquely identifying the data portion file with respect to the other data portion files corresponding to the virtual device, and the total number of data portion files corresponding to the virtual device. Using the file names, servers can transmit/receive the data portion files to/from other servers in the cluster.

Different criteria can be used to select the servers to store the data portion files. For example, the servers can be selected, at least in part, based on the relative available storage capacity of each server. As another example, if parity data is used, the server to store the parity data can be selected randomly, so that parity data is not always stored on the same server.

The client can be notified that the data set has been successfully written to the virtual device at various times depending on the criticality of the data set. One method includes notifying the client of a successful write after the data set is received (e.g., only in main memory, local volatile memory, etc.), but before the data set is written to the virtual device. Another method includes writing the data set to local non-volatile memory, and notifying the client of a successful write after the data set is written to the non-volatile memory, but before the data set has been written to the virtual device. Optionally, an entry is made in at least one (preferably two) fact servers, indicating that valid data is stored in local memory. Yet another method includes notifying the client of a successful write only after the data set has been written to the virtual device. Optionally, any of the above client notification methods can be invoked depending on a predetermined criteria including, but not limited to, data type, file name extension, and/or client parameters such as IP address, priority, etc.

A particularly secure method for writing the parsed data set to the virtual device includes transmitting a ready signal to a backup controller after transmitting each of the data portion files to a corresponding one of the network servers, transmitting a "commit" signal to each of the network servers, and transmitting a "done" signal to the backup controller. The commit signals cause the servers to commit the respective data portion files to memory (e.g., queue the data portion files to be written to local nonvolatile storage). If the backup server receives the ready signal, but does not receive the done signal, then the backup server will complete the data write by transmitting commit signals to the servers, thereby completing the data write.

A more particular method includes determining whether a confirmation signal indicating that the respective data portion file has been committed to memory has been received from each server. If a confirmation signal is not received from a particular server, then a write failure entry identifying the potentially corrupt data portion file is written to at least one fact server. Optionally, the write failure entry is written to at least two fact servers. As yet another possibility, the fact servers may replicate their entries amongst one another. The fact servers can then be periodically polled, and data portion files identified as potentially corrupt can be reconstructed.

A distributed network data retrieval method includes receiving a data request from a client, retrieving a virtual device definition identifying device portions located on a plurality of network servers, retrieving data portion files from the device portions, collating the retrieved data portion files to generate the requested data, and transmitting the requested data to the client. In a particular embodiment, the step of retrieving the data portion files from the device portions includes transmitting requests for the data portion files to the network servers hosting the device portions, and receiving the data portion files from the servers. Optionally, communication with the client occurs over one network, and communication with the servers occurs over another network.

In one particular method, the step of retrieving the data portion files includes determining which one of a plurality of controllers has access to the virtual device, and invoking the controller with access to retrieve the data portion files. Optionally, which of the controllers have access to the virtual device depends on what type of data is stored in the virtual device.

Methods for reconstructing corrupt data are also disclosed. For example, in one method, the step of receiving the data portion files includes receiving all but one of the data portion file, and the step of collating the data portion files includes generating the missing data portion file based on parity data. Another method includes periodically polling fact servers to identify potentially corrupt data, and then reconstructing the potentially corrupt data (e.g., by parity data, locally stored known valid data, etc.).

The data storage and retrieval methods of the present invention can be implemented in hardware, software, firmware, or some combination thereof. It is expected that code will embodied in a computer-readable medium, and when executed by an electronic device, the code will cause the electronic device to perform the methods of the invention.

One particular data storage system includes a network interface to facilitate communication between clients and a file server application, and to facilitate communication between the file server application and a plurality of network servers that provide storage for data portion files. The file server, responsive to receiving a file from one of the clients, defines a virtual device to include device portions on the network servers, parses the file into a plurality of file portions, and writes each of the file portions to a corresponding one of the device portions. In a particular embodiment, the network interface includes a first network adapter to facilitate communication with the clients via a first network, and a second network adapter to facilitate communication with the servers via a second network. Optionally, the data storage system includes a local data storage device, whereby the data storage system is capable of functioning as one of the servers. In the disclosed embodiment, each user file is stored in its own virtual device.

The disclosed embodiment of the system includes a client process for receiving the file from the client, and a distribution controller. The distribution controller, responsive to the client process, determines the number of file portions into which the file is to be parsed, selects a number of the servers corresponding to the number of file portions, and defines a portion file for each selected server to store a corresponding one of the file portions. If the distribution scheme uses parity data, the distribution controller also defines a portion file to store the parity data, and selects an additional server. Optionally, the distribution controller determines the number of file portions and/or the distribution scheme based, at least in part, on the type of file received from the client. In a particular embodiment, when selecting the servers to store the portion files, the distribution controller determines the available storage capacity of the servers, and selects the servers with the greatest storage capacity.

The distribution controller can transmit (via the client process) a signal to the client confirming storage of the file at various times. In one case (mode 1), the confirmation signal is transmitted to the client after the file is received, but before the distribution controller writes the file to the virtual device. In another case (mode 2), the distribution controller writes the file to local non-volatile memory, and transmits the confirmation signal to the client after the data is stored in the local non-volatile memory, but before the file has been written to the virtual device. Optionally, the distribution controller writes an entry to at least one (preferably at least two) fact servers, to indicate that valid data is available in local storage. In yet another case (mode 3), the client process transmits the confirmation signal only after the file is written to the virtual device. The distribution controller can select between the various modes based on some predetermined criteria (e.g., file type, file name, etc.).

In the disclosed embodiment, the distribution controller writes data to the virtual devices via a secure method. After transmitting the portion files to the servers, the distribution controller transmits a ready signal to a backup controller, transmits a commit signal to each server to cause the server to commit the portion file to memory, and then transmits a done signal to the backup controller. If the backup controller receives the ready signal, but does not receive the done signal (e.g., the system crashes during the write process), then the backup controller will transmit the commit signals to the servers to complete the write process.

The distribution controller is further operative to determine whether a confirmation signal (indicating a successful portion file write) has been received from each server. If not (e.g., in the event of a machine crash), the distribution controller writes a write failure entry to at least one fact server to identify potentially corrupt data. Preferably, entries are made in at least two fact servers, with each of the fact servers residing on a different one of the network servers. A local controller can then periodically poll the fact servers, even if one of the servers is down, and reconstruct any data identified as corrupt.

Data can also be retrieved from the system. The file server, responsive to a file request from a client via a client interface, retrieves a virtual device definition (identifies file portions on network servers), retrieves the file portions, and collates the file portions to generate the requested file. The requested file is then transmitted to the client. In order to retrieve the virtual device definition, a local controller retrieves virtual meta-data device information (identifying meta-data device portions) from the current directory, and a distribution controller retrieves meta-data portion files from the meta-data device portions, collates the meta-data portion files to generate the meta data which includes the virtual device definition.

Access to the virtual devices is controlled by a plurality of controllers. Prior to reading data from a virtual device, the client interface determines which of the controllers has access to the virtual device. The controllers may reside on the network servers and/or the data storage system. Optionally, which controller has access to the virtual device depends on the type of file stored in the virtual device. In a particular embodiment, each controller has access only to virtual devices storing a single type of files.

The foregoing summary describes the data storage system from the perspective of the system residing on one machine and interacting with a plurality of network servers. It should be understood, however, that the system can be considered to include a plurality of similar machines, each acting as both a client interface and a server for storing the portion files. In fact, the entire system, including but not limited to the client interface, the virtual device access control, and the virtual devices can be distributed across a plurality of servers.

BRIEF DESCRIPTION OF THE DRAWINGS

The present invention is described with reference to the following drawings, wherein like reference numbers denote substantially similar elements:

FIG. 5 shows a data structure suitable for implementing one particular embodiment of the present invention;

DETAILED DESCRIPTION

The present invention overcomes the problems associated with the prior art, by providing a distributed network data storage system and method. In the following description, numerous specific details are set forth (e.g., particular data structure, RAID scheme, etc.) in order to provide a thorough understanding of the invention. Those skilled in the art will recognize, however, that the invention may be practiced apart from these specific details. In other instances, details of well known computer programming practices (e.g., particular languages, operating systems, etc.) and hardware (e.g., bus structures, network connections, etc.) have been omitted, so as not to unnecessarily obscure the present invention.

Figure 1:
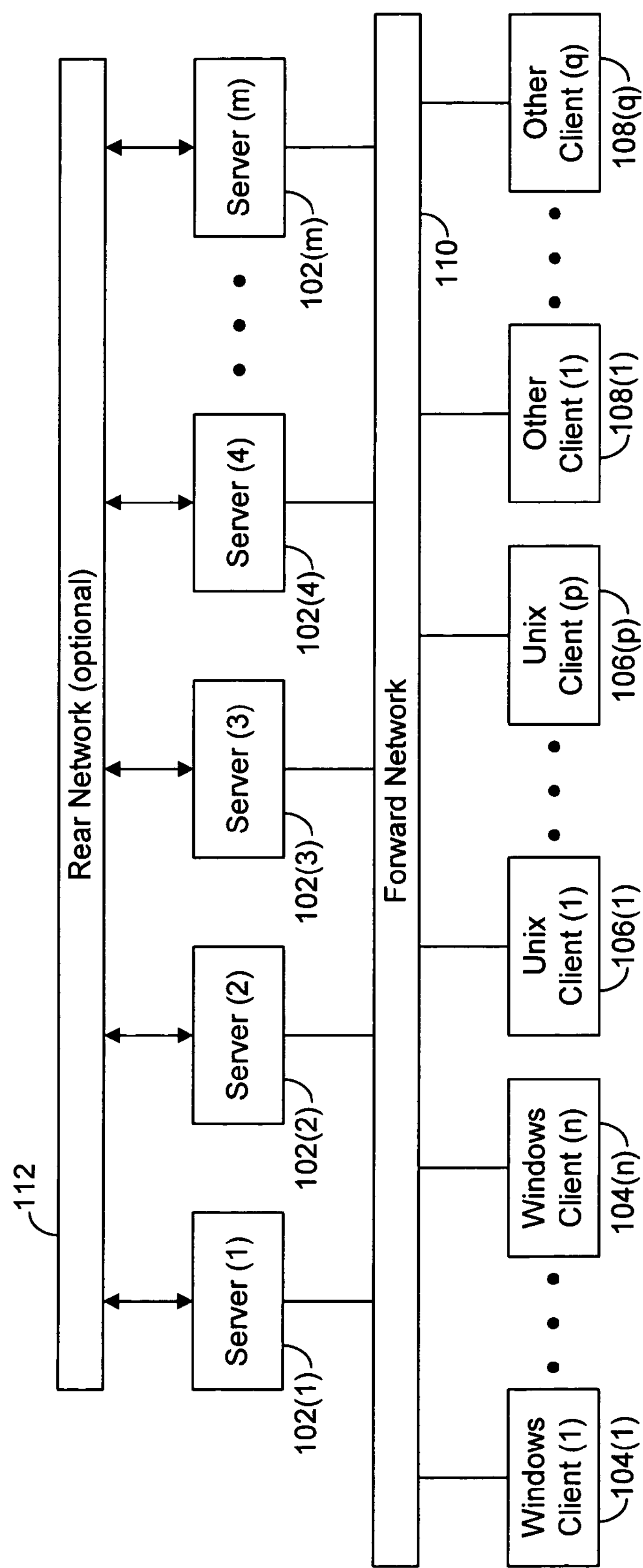
FIG. 1 is a block diagram of a network server cluster.

FIG. 1 is a block diagram showing a plurality of network servers 102(1-M), a plurality of WINDOWS® clients 104 (1-*n*), a plurality of Unix® clients 106(1-*p*), and a plurality of other clients 108(1-*q*), all connected via a forward network 110. Servers 102(1-*m*) provide data storage and retrieval services to clients 104, 106, and 108, via network 110. Other clients 108(1-*q*) are shown to illustrate that servers 102(1-*m*) can be configured to serve virtually any network client.

Servers 102(1-*m*) are also coupled to one another via an optional rear network 112, which facilitates communication between servers 102(1-*m*). Rear network 112 is not essential to the operation of the present invention, because servers 102(1-*m*) can communicate with one another via forward network 110. However, using rear network 112 for server to server communication reduces the network traffic burden on forward network 110.

Servers 102(1-*m*) store data in virtual devices that are distributed across network servers 102(1-*m*). For example, a virtual device can be defined to include four device portions, one device portion on each of servers 102(1–4). When one of servers 102 (e.g., 102(1)) receives a file from a client (e.g., client 104(1)), via forward network 110, server 102(1) parses the file into a number of file portions (according to the virtual device definition), and transmits each of the file portions to a corresponding one of servers 102(1-*m*) for storage. Similarly, when client 104(1) requests a file, server 102(1) retrieves the file portions from servers 102(1–4), collates the file portions, and transmits the file to client 104(1). The operation of servers 102(1-*m*) will be discussed in greater detail hereinafter.

In this particular embodiment of the invention, each of servers 102(1-*m*) are configured similarly. Thus, any of servers 102(1-*m*) can service client requests and/or provide file portion storage. This is not, however, an essential element of the invention. For example, certain ones of servers 102(1-*m*) can be configured to service client connections, but not store file portions, and vice versa.

Figure 2:
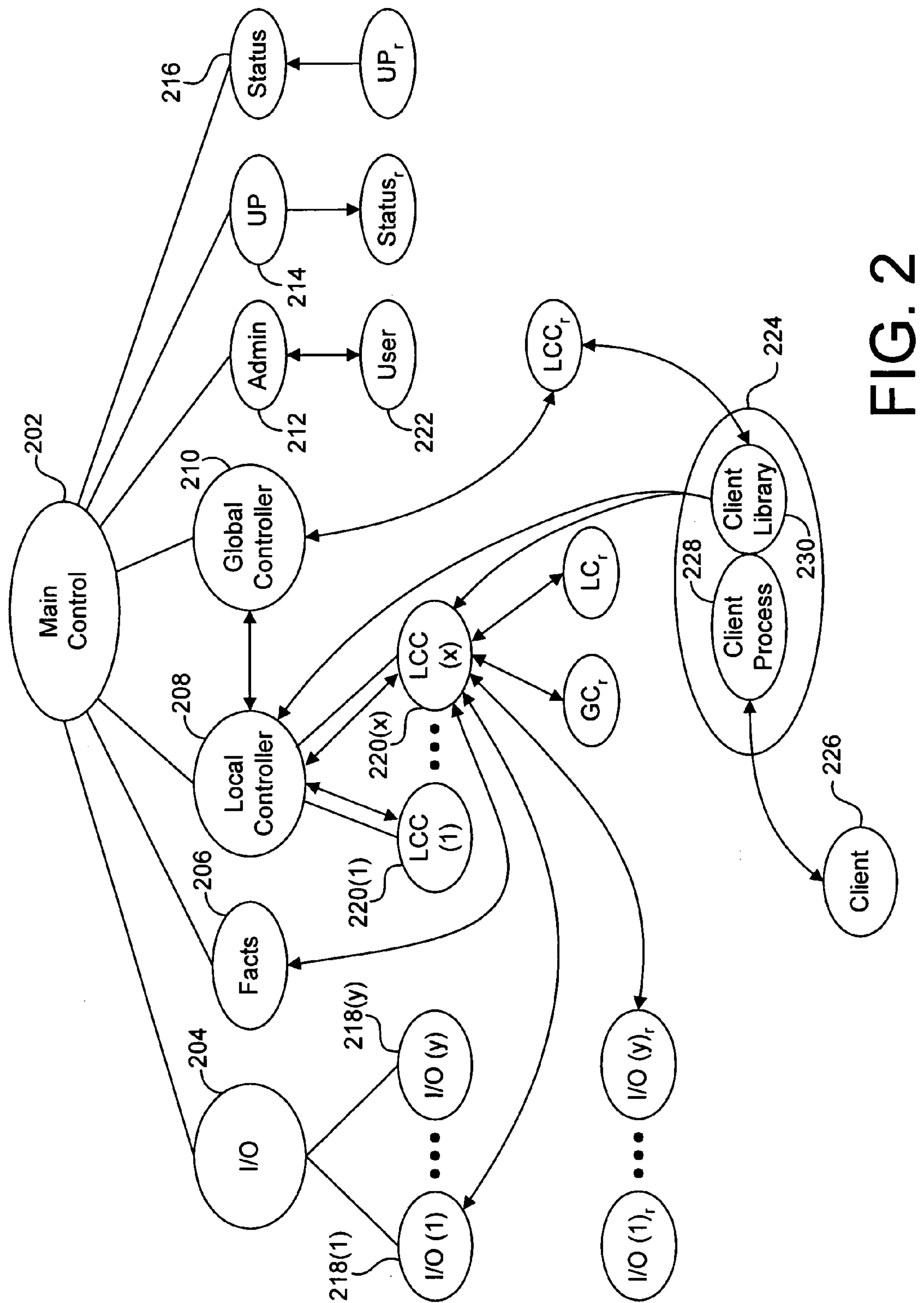
FIG. 2 is a relational diagram illustrating communication between various processes of one embodiment of the present invention.

FIG. 2 is a relational diagram showing the functional relationships between the processes operating on servers 102(1-*m*). In FIG. 2, arrows between processes indicate message passing between the respective processes. Lines without arrows indicate that one process has forked the process below it. Finally, process labels with a subscript (r) indicate that the process is running on a remote server (i.e., a different one of servers 102(1-*m*). For the sake of explanation, the local processes shown in FIG. 2 are considered to be running on server 102(1). The remote processes are considered to be running on one or more of servers 102(2-*m*).

At start-up, a main control process 202 forks an input/output (I/O) process 204, a fact server 206, a local controller (LC) 208, a global controller 210, an admin process 212, an "up" indicator 214, and a status process 216. Main control process 202 also monitors the forked processes, and terminates and reforks any processes that become unstable or unresponsive.

I/O process 204 forks a plurality of I/O subprocesses 218(1-*y*) which handle the transfer of portion files between server 102(1) and similar I/O processes running on remote servers 102(2-*m*). Local controller 208 forks local child controllers (LCCs) 220(1-*x*) which are responsible for controlling the access to virtual devices, and for the parsing of files and collation of file portions necessary to service client requests. Fact server 206 stores information relating to potentially corrupt data in virtual devices, and information relating to valid data that is being temporarily stored on servers 102(1-*m*).

Global controller (GC) 210 ensures that access to each virtual device is granted exclusively to only one LCC 220 at a time. In order to be sure that there are no access conflicts between LCCs 220 running on different ones of network servers 120(1-*m*), global controller 210 runs on only one of servers 102(1-*m*). At start-up, servers 102(1-*m*) engage in a multi-round election protocol to determine which of servers 102(1-*m*) will host global controller 210.

In alternate embodiments, multiple global controllers can be used. Access conflicts can be successfully avoided when using multiple global controllers by assigning each of the virtual devices to only one global controller according to some determinable criteria. For example, it is possible two use two global controllers, by assigning the odd numbered virtual devices to one of the global controllers, and assigning the even numbered virtual devices to the other.

Admin process 212 provides a means for a user (e.g., network administrator) to control the operation (e.g., set configuration parameters) of network server 102(1). UP process 214 monitors server 102(1) and provides a signal (e.g., a status flag) that indicates whether server 102(1) is up (e.g., able to send/receive data) or down. Status process 216 determines the status (up or down) of servers 102(2-*m*), and makes that status information available to other processes running on server 102(1). Status process 216 determines the status of the other servers by polling the UP processes running on servers 102(2-*m*). Similarly, status processes running on servers 102(2-*m*) poll UP process 214 running on server 102(1) to determine its status.

A client interface 224 facilitates communication with a network client 226. Client interface 224 includes client process 228 that establishes and maintains a network connection with client 228. Client process 228 is specific to the particular type of client (e.g., UNIX®, WINDOWS®, etc.) being hosted. Several different client processes can be hosted by providing a client process for each different type of client. Client library 230 is an application program interface (API) that allows client process 228, and any other supported client processes, to communicate with LC 208 and LCCs 220. In this particular embodiment, clieint library 230 also handles the coordination of multiple file system objects (e.g., multicomponent path name resolution, moving files between directories, etc.), when necessary to satisfy a particular file request.

Data retrieval occurs as follows. When client process 228 is initiated, client library 230 polls LC 208 to determine which of LCCs 220(1-*x*) is assigned as its primary LCC. For sake of explanation, assume that LCC(x) is the default LCC. Then, when client library 230 receives a file request from client 226, via client process 228, client library 230 executes a remote procedure call (RPC) to LCC 220(*x*) to determine which LCC has access to the virtual device storing the requested file. If LCC 220(*x*) has access to the virtual device, then LCC 220(*x*) returns its own identifier to client library 230. Otherwise, LCC 220(*x*) executes an RPC to GC 210 (whether local or remote) to lookup or register the virtual device. If access to the virtual device has already been granted to an LCC (local or remote), then GC 210 returns the identifier of the LCC with access. Otherwise, GC 210 registers the device to the requesting LCC 220(*x*), and returns the identifier of LCC 220(*x*). When a device is first registered with an LCC 220, the LCC 220 notifies its LC 208 of the device registration, to facilitate monitoring of the LCC 220 by the LC 208. Finally, LCC 220(*x*) returns the identifier of the LCC with access to the virtual device to client library 230.

Client library 230 includes a definition of the virtual device along with the RPC to determine which LCC has access to the device. The virtual device definition is obtained by client library 230 by retrieving meta-data containing the definition, as will be described in greater detail hereinafter. The virtual device definition is thus provided to an LCC when access to the device is registered to the LCC, so that each LCC will always have the virtual device definition of all devices that are registered to the LCC.

Assuming for the sake of explanation that client library 230 determines that LCC 220(*x*) (local) has access to the virtual device storing the requested file, then client library 230 forwards the file request to LCC 220(*x*). Upon receiving the file request, LCC 220(*x*) uses the previously provided definition of the virtual device storing the requested file to retrieve the file. Among other information, the virtual device definition includes the names of files storing portions of the requested file (portion files), and the ones of servers 102(1-*m*) on which the portion files are stored. In order to retrieve the requested file, LCC 220(*x*) transmits requests for the portion files to the I/O subprocesses 218(1-*y*) (whether local or remote) running on the corresponding ones of servers 102(1-*m*). The I/O subprocesses 218(1-*y*) then retrieve the requested file portions from their local data storage (i.e., the data storage on the server hosting the respective I/O process), and transmit the file portions to the requesting LCC 220(*x*). LCC 220(*x*) then collates the file portions to generate the requested file, and provides the requested file to client library 230, which transmits the file to client 226 via client process 226.

Data is written to a virtual device in a somewhat similar manner. An LCC with access to the virtual device receives a file from client 226, via client process 228 and client library 230. The LCC then retrieves the virtual device definition, parses the file into portion files according to the virtual device definition, and writes the file portions to respective ones of servers 102(1-*m*) via I/O subprocesses 218(1-*y*) and/or remote I/O subprocesses 218.

Figure 3:
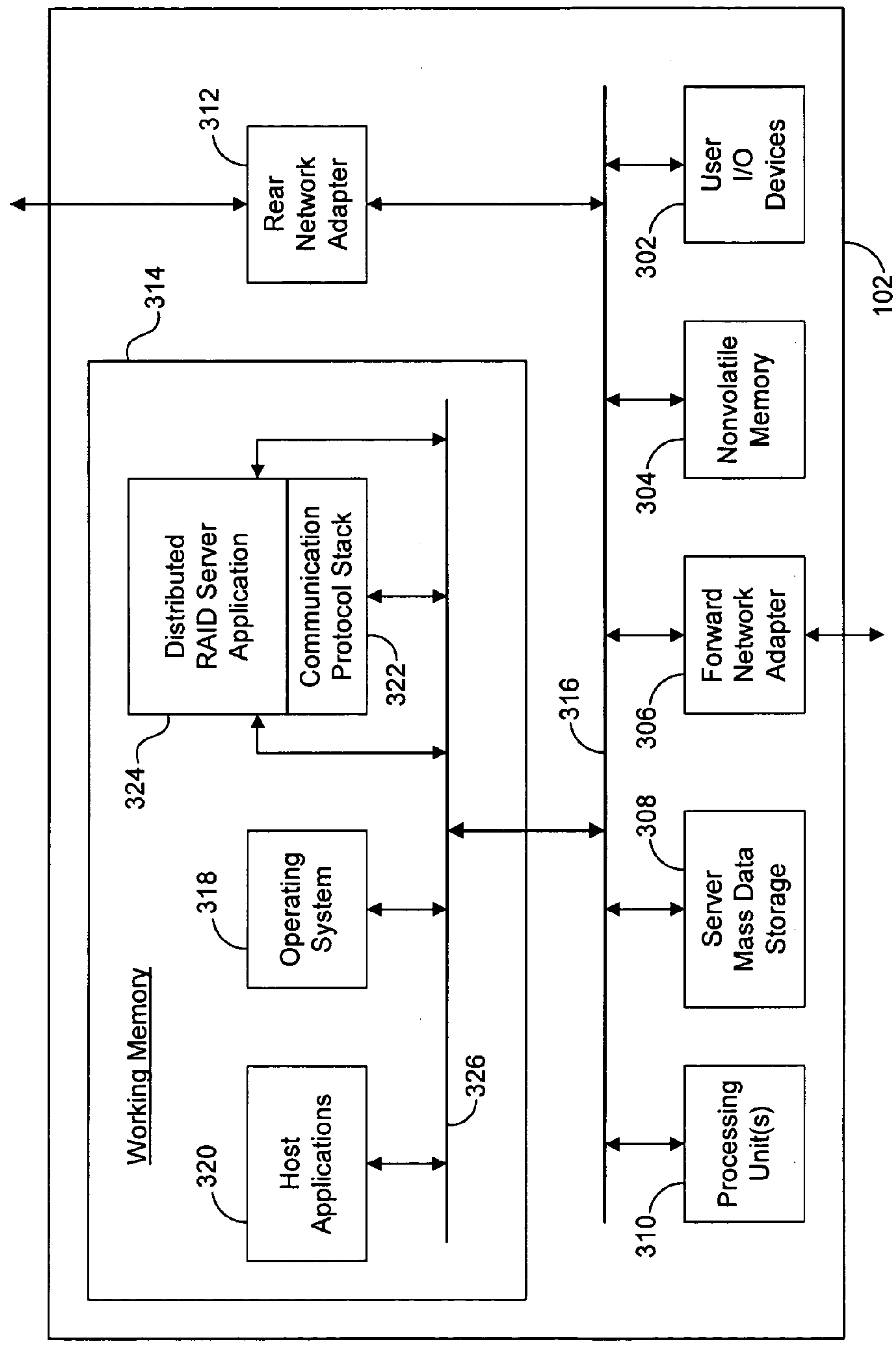
FIG. 3 is a block diagram showing a network server of FIG. 1 in greater detail.

FIG. 3 is a block diagram showing one of servers 102(1-*m*) in greater detail. Server 102 includes user I/O devices 302, nonvolatile memory 304, forward network adapter 306, server mass data storage 308, processing unit 310, rear network adapter 312, and working memory 314, all intercommunicating via internal bus 316 (e.g., PCI bus). User I/O devices (e.g., keyboard, mouse, monitor, etc.) provide a means for user configuration and administration of server 102. Nonvolatile memory 304 (e.g., ROM, PROM, EPROM, etc.) stores basic code necessary to boot server 102, and retains the boot code even when server 102 is powered down. Forward network adapter 306 (e.g., an Ethernet card) provides an interface to forward network 110 (FIG. 1) to facilitate communication with clients 104, 106 and/or 108. Server mass data storage 308 (e.g., a local hard disk) provides storage for client data, application programs, an operating system, etc. Processing unit 310 imparts functionality to server 102 by executing code stored in nonvolatile memory 304, mass data storage 308, and/or working memory 314. Rear network adapter 312 provides an interface to rear network 112 (FIG. 1) to facilitate communication between servers 102(1-*m*).

Working memory 314 (e.g., SRAM, DRAM, etc.) provides random access memory for use by processing unit 310, and includes an operating system (OS) 318, host applications 320, a communications protocol stack 322 and a distributed RAID server application (DRSA) 324, all of which are transferred into working memory 314 from server mass data storage 308 or some other computer readable media (e.g., an optical disk, a floppy disk, or any other media capable of storing computer code). Operating system 318 (e.g., LINUX®, WINDOWS NT®, UNIX®, etc.) is a low level program on top of which other programs run. Host applications include higher level applications (e.g., word processors, e-mail servers, network maintenance programs, etc.) that provide useful functionality to server 102, apart from the data storage function of the present invention. Communications protocol stack 322 is a standard protocol stack (e.g., TCP/IP) which facilitates communication with other machines over an internetwork. Standard protocol stacks are well known in the art. See, for example, W. Richard Stevens, *TCP/IP Illustrated, Vol.* 1 (Addison-Wesley, 1994), which is incorporated herein by reference.

DRSA 324 is an application program that performs the data distribution and storage functions of one particular embodiment of the present invention. In particular, DRSA 324 defines virtual devices to include device portions on a number of network servers 102(1-*m*), and reads/writes client data from/to the virtual devices. DRSA 324 runs on top of communications protocol stack 322 to facilitate the distribution of client data across a plurality of servers 102(1-*m*).

While OS 318, host applications 320, communication protocol stack 322, and DRSA 324 are shown as complete functional blocks within working memory 314, it should be understood that these components consist of computer code that imparts functionality to server 102 when executed by processing unit 310. Of course, the code need not reside in any particular memory location. In fact, much of the code may reside outside of memory 314 (e.g., on server mass data storage 308), with portions of the code being transferred into and out of memory 314 as necessary for execution by processing unit 310. It is helpful, however, for purposes of explanation, to consider the applications as functional blocks operating within memory 314, and communicating with the other components of server 102 via a memory bus 326 and server bus 316.

Figure 4:
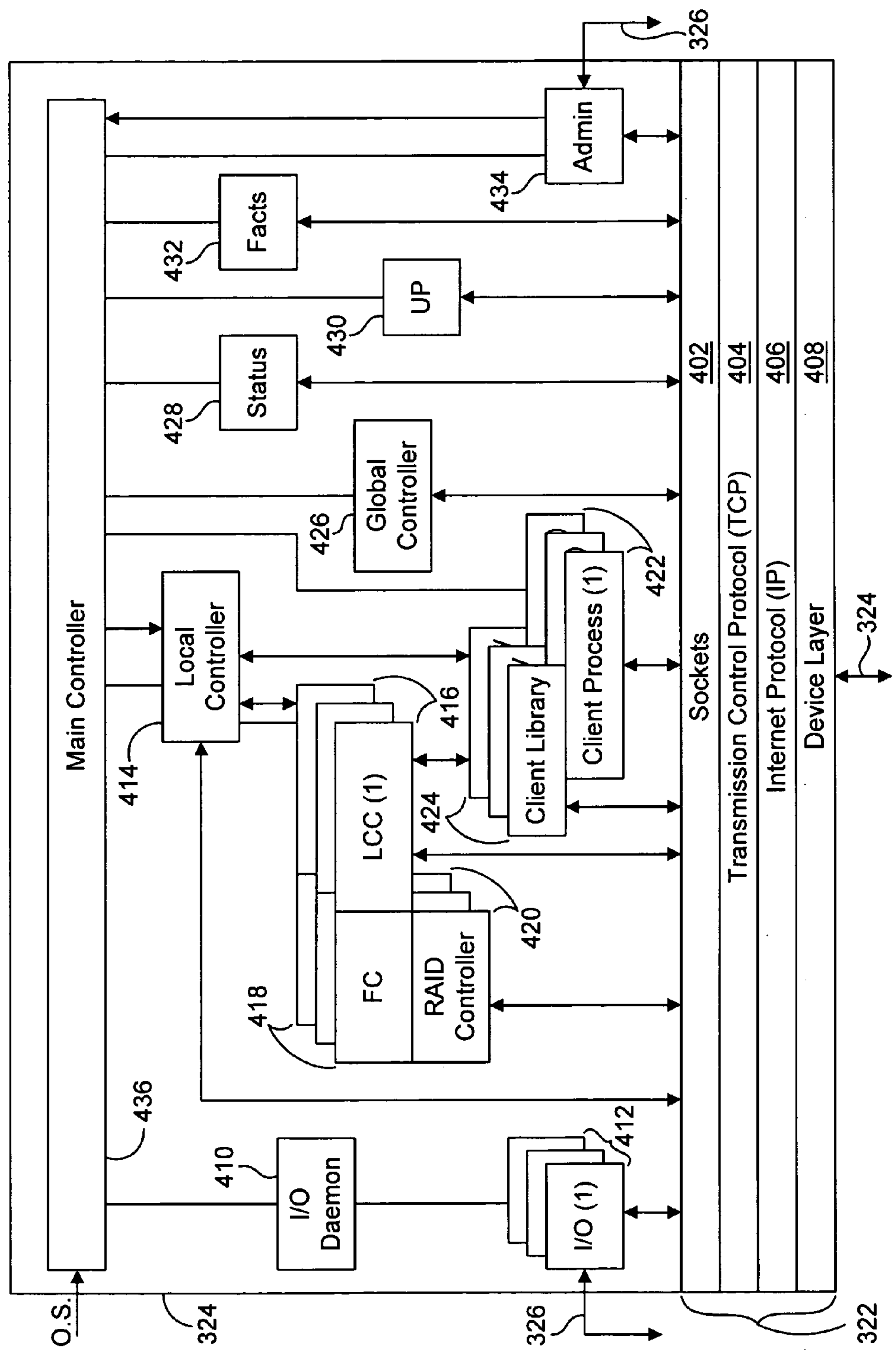
FIG. 4 is a block diagram showing the distributed raid server application of FIG. 3 in greater detail.

FIG. 4 is a block diagram showing communication protocol stack 322 and DRSA 324 in 1F greater detail. In this particular embodiment, communication protocol stack 322 is a conventional TCP/IP stack that includes a sockets layer 402, a transmission control protocol layer 404, an internet protocol layer 406, and a device layer 408. The particular communication protocol stack employed is not considered to be an essential aspect of the present invention. In fact, the present invention may be practiced with any known, or yet to be developed, protocol for providing communication between network servers.

DRSA 324 includes an input/output (I/O) daemon 410, a plurality of I/O modules 412, a local controller (LC) 414, plurality of local child controllers (LCCs) 416, a plurality of file controllers (FCs) 418, a plurality of RAID controllers (RCs) 420, a plurality of client processes 422, a plurality of client libraries 424, a global controller 426, a status process 428, an “up” indicator 430, a facts server 432, and an admin process 434, all initiated and monitored by a main controller 436. The components of DRSA 324 function similar to the corresponding processes described above with respect to FIG. 2. However, FIG. 4 provides greater detail with respect to how some of those functions are carried out.

In the view of FIG. 4, lines with arrows indicate message passing between components, whereas lines without arrows indicate the initiation and monitoring of one component by another component above it. Blocks shown directly abutting one another indicate that one code block is running on top of the other, similar to the layers of communication protocol stack 322.

At start up, main controller 436 forks I/O daemon 410, LC 414, client processes 422, global controller 426, status process 428, “up” indicator 430, fact server 432, and admin process 434. I/O daemon 410 then forks 11O sub processes 412, and LC 414 forks LCCs 416.

Client processes 422 listen for and service requests (e.g., store data, retrieve data, etc.) from network clients via protocol stack 322. Client processes 422 run on top of client libraries 424 to facilitate direct communication with LC 414 and LCCs 416, and with remote LCCs via protocol stack 322. As indicated above with respect to FIG. 2, each of client processes 422 communicate with LC 414, via client libraries 424, once at start up to determine which of LCCs 416 is assigned as the default LCC for the particular client process. Then, when one of client processes 422 receives a client request, it polls its default LCC to determine which LCC (local or remote) has access to the virtual device necessary to service the request, and transmits the request to the LCC with access to the virtual device.

Recall from the discussion of FIG. 2 that LCCs 416 serve multiple functions. In particular, LCCs 416 must determine and/or obtain access to virtual devices, and must also read data from and write data to virtual devices.

The device access function is accomplished by LCCs 416 communicating with GC 426 via protocol stack 322. If GC 426 is running on the same server as LCC 416, then the messages need only pass through the sockets layer 402 of protocol stack 322. If GC 426 is running on a remote server, then the messages must pass through protocol stack 322 and out over network 112. Additionally, each of LCCs 416 notify local controller 414 of each virtual device that the particular LCC obtains access to, so that LC 414 can notify GC 426 to free up access to devices assigned to LCCs which become unstable or unresponsive.

LCCs 416 with access to particular virtual devices read and write data to and from those virtual devices by invoking FCs 418, which in turn invoke RCs 420. FCs 418 include typical file control operations (e.g., listing files in a directory, reading a file, writing a file, etc.), which can be invoked by LCCs 416 depending on the particular requests received from the client processes 422. FCs 418 then invoke RCs 420 to transfer data to/from the virtual devices. Note that in the relational diagram of FIG. 2, the FC functions and RC functions are understood to be included in LCCs 220(1-*x*).

When data is requested from an existing virtual device, the virtual device is identified by an identifier included in the request from client process 422. When new data (e.g., a new directory, a new file, etc.) is to be stored, a new virtual device is created to store the new data. In either case, RCs 420 use the virtual device identifiers to retrieve information used to transfer data to or from the virtual device. Among other information, the virtual device information identifies portions of the virtual device dispersed on at least some of servers 102(1-*m*).

RCs 420 write data to a virtual device by parsing the data set into a plurality of portions, and then transmitting (via 11O processes 412) each of the data portions to corresponding ones of the device portions located on network servers 102(1-*m*). Similarly, RCs 420 read data from a virtual device by retrieving (via I/O processes 412) the data portions from the device portions located on network servers 102(1-*m*), and collating the device portions to generate the requested data. RCs 420 can be configured to distribute and/or retrieve data portions according to any known or yet to be developed RAID scheme.

As indicated above, RCs 420 transmit/retrieve data portions to/from virtual device portions via I/O processes 412 running on each of servers 102(1-*m*). In this particular embodiment, RCs 420 transfer the data portions as independent data portion files, which can be written to or read from network servers 102(1-*m*) via conventional protocol stacks and operating systems. RCs 420 communicate with local I/O processes 412 via sockets layer 402, and with remote I/O processes 412 via protocol stack 322 and network 112. Each of I/O processes 412 (local or remote) can write data portion files to the mass data storage 308 of its host server (the server on which the I/O process is running) via memory bus 326 and server bus 316.

Because the portion files are handled by the file system of the host operating system (e.g., the Ext3 file system of LINUX®), they can automatically grow in size to store as much data as is necessary for a particular data portion file. For example, the file system handles the low level block management functions, including but not limited to, mapping physical disk blocks to store the contents of a data portion file. Further, the disclosed embodiment also takes advantage of features provided by the underlying file system, such as journalling and other reliability features.

The data portion files are named to facilitate data recovery in the event of a system failure. Each portion file name includes the virtual device number, a number identifying the portion file, and the total number of portion files in the virtual device. For example the file name (727-3-4) corresponds to the third of four portion files in virtual device number 727. In the event of a failure that results in the loss of the virtual device information, the data can still be reconstructed by scanning the servers and collating the portion files according to their names.

Main controller 436 monitors the overall operation of DRSA 324. For example, if a process (e.g., one of I/O processes 412) of DRSA 324 becomes unstable or unresponsive, OS 318 notifies main controller 436 of the unresponsive process, so that main controller 436 can terminate and reinitiate the process (e.g., via I/O Daemon 410).

Status process 428 periodically polls the "up" indicators 430 of the other servers in the cluster to determine the status of those servers. Fact server 432 stores "facts" relating to potentially corrupt data portion files. Entries can be written to and read from fact server 428 by any of servers 102(1-*m*) in the cluster. Admin process 434 facilitates interaction with a user (e.g., a network administrator) in order to set configuration parameters, reconstruct data after a system failure, etc. A user can access admin process 434 via one or both of networks 110 and 112, or directly via user I/O devices 302.

FIG. 5 shows one particular data structure that can be implemented with the present invention, and illustrates the concept of using of virtual devices. The data structure includes directory data objects, meta-data objects, and file data objects. Directory data records are stored in a directory data device 502, meta-data records are stored in a meta-data device 504, user files are stored in a file data device 506.

Although only one of each type of device is shown in FIG. 5, it should be understood that many of each of the device types are used in the disclosed embodiment of the invention. Although the invention may be implemented with a large or small number of such devices, the inventors have found that using a large number of devices provides certain advantages (e.g., reduced access conflicts, easier data reconstruction after a system failure, etc.). Therefore, in one embodiment of the invention, only one type of data is written to each device. For example, each directory data device stores only records relating to entries in a single directory. Similarly, each meta-data device 504 stores meta-data records for entries in a single directory. Further, each file data device 506 stores only one user data file (e.g., a word processing file).

While the above described storage scheme provides certain advantages, this particular element (as well as other described elements, even if not explicitly stated) should not be considered to be an essential aspect of the present invention. As indicated above, the invention may be practiced using a smaller number of devices, with each device storing a greater number of files/records. For example, each file data device can be configured to store a plurality of files, by providing an index in the device based on, for example, the user ID. As another example, a device can include more than one type of data (e.g., directory and meta-data). Alternatively, the system can be implemented without separate meta-data devices, by including the meta-data directly in the file data devices, and including the file data device info directly in the directory data device records.

Directory data device 502 includes a plurality of records 508(1-*a*), each corresponding to an entry (e.g., a file or a sub-directory) in a directory associated with device 502. Each of records 508(1-(*a*-1)) includes a "file/dir name" field, a "user ID" field, a "meta-data device info" field, and a pointer. Record 508(*a*) includes the same fields, except that the pointer field is replaced with an "E.O.D." that marks the end of the directory. Those skilled in the art will recognize records 508(1-*a*) as a linked list, but should also understand that the present invention is not limited to linked-list data structures.

The "file/dir name" field of each of records 508(1-*a*) includes the name (e.g., file name or sub-directory name) of a data set (e.g., file or sub-directory) associated with the particular record. The "user ID" field includes an identifier uniquely associated with the data set represented by the directory entry. The "meta-data device info" field includes information used to access the device storing the meta-data associated with the data set. The access information includes, for example, a device identifier, a RAID version, and the stripe info (portion file names and storing servers). The pointer field includes the start address of the next record.

Meta-data device 504 includes a plurality of meta-data records 510(1-*a*), each corresponding to one of records 508(1-*a*), and, therefore, also corresponding to the entries in the directory associated with device 502, and the data sets represented thereby. Each of meta-data records 510(1-(*a*-1)) includes a "user ID" field, a "meta-data" field, a "data/sub-dir device info" field, and a "pointer" field. The user ID field includes the same unique identifier included in the user ID field of the corresponding one of records 508(1-*a*), which corresponds to the data set associated therewith. The meta-data field includes the meta-data (e.g., creation date, author, privileges, etc.) for the associated user data set. The data/sub-dir device info field includes information used to access the device storing the user file data. The pointer field includes the start address of the next record. Record 510(*a*) is similar to the other records 510, except that instead of a pointer field record 510(*a*) includes an E.O.D. indicator that signifies that it is the last of records 510(1-*a*).

Note that the data/sub-dir device information in records 510(1-*a*) need not be identical to the meta-data device information in records 508(1-*a*). Obviously, the information points to different devices. Further, the device information may indicate different RAID versions/implementations. This feature facilitates the use of different RAID techniques for different types (e.g., meta-data, file data, directory data, etc.) of data.

Note also that records 508 and 510 need not necessarily exist in a one to one relationship. For example, if one of directory records 508 is moved to a different directory data device, it is not necessary to move the corresponding meta-data device record 510.

File data device 506 includes user data and an end-of-file (E.O.F.) indicator. Virtually any type of user data can be stored in file data device 506.

As implemented in the present invention, directory data devices 502, meta-data devices 504, and file data devices 506 are virtual devices. The devices do not exists as a single physical device. Rather, each of the devices are distributed across servers 102(1-*m*).

FIG. 5 shows an example of how a virtual device (e.g., file data device 506) is distributed across a plurality (e.g., servers 102(1–4)) of servers 102(1-*m*). In this example, the user ID of the data set stored in the device is "727." The bits of the user data are divided into three file portions, and each file portion is written to a respective one of servers 102(1–3). A fourth file portion (727-4-4) includes parity data generated from the first three file portions (727-1-4, 727-2-4, and 727-3-4).

As shown in FIG. 5, the user data is divided into a block size of one bit. That is, file 727-1-4 includes the first bit of the user data, file 727-2-4 includes the second bit of the user data, file 727-3-4 includes the third bit of the user data, and so on. It should be understood, however, that larger block sizes may be used. For example, writing bytes 1–512 to file 727-1-4, writing bytes 513–1024 to file 727-2-4, writing bits 1025–1536 to file 727-3-4, and so on, results in a block size of 512 bytes.

It should be apparent that according to the disclosed data structure, data retrieval is a two-step process. Meta-data device info from a record 508 of a current directory data device 502 is used to retrieve a meta-data record 510 from a meta-data device 504. Then, the data/subdirectory device info from meta-data record 510 is used to retrieve associated user file data from a file data device (if the original directory entry 508 corresponds to a user file), or to retrieve a new set of directory records 508 from a new directory data device 502 (if the original directory entry 508 corresponded to a subdirectory).

Each time a client library requests a file/directorylmeta-data operation from an LCC, the client library provides the user ID and the virtual device ID along with the request. These parameters permit the LCC to distinguish between corresponding records in devices containing multiple records.

FIGS. 6–15 summarize methods of the present invention. These methods are described with respect to the relational diagram of FIG. 2 to facilitate a clear understanding of the invention. It should be understood, however, that the methods described are not limited to any particular system or structure. In fact, it should be understood that the inventive methods disclosed herein can be implemented on a wide variety of network systems.

Figure 6:
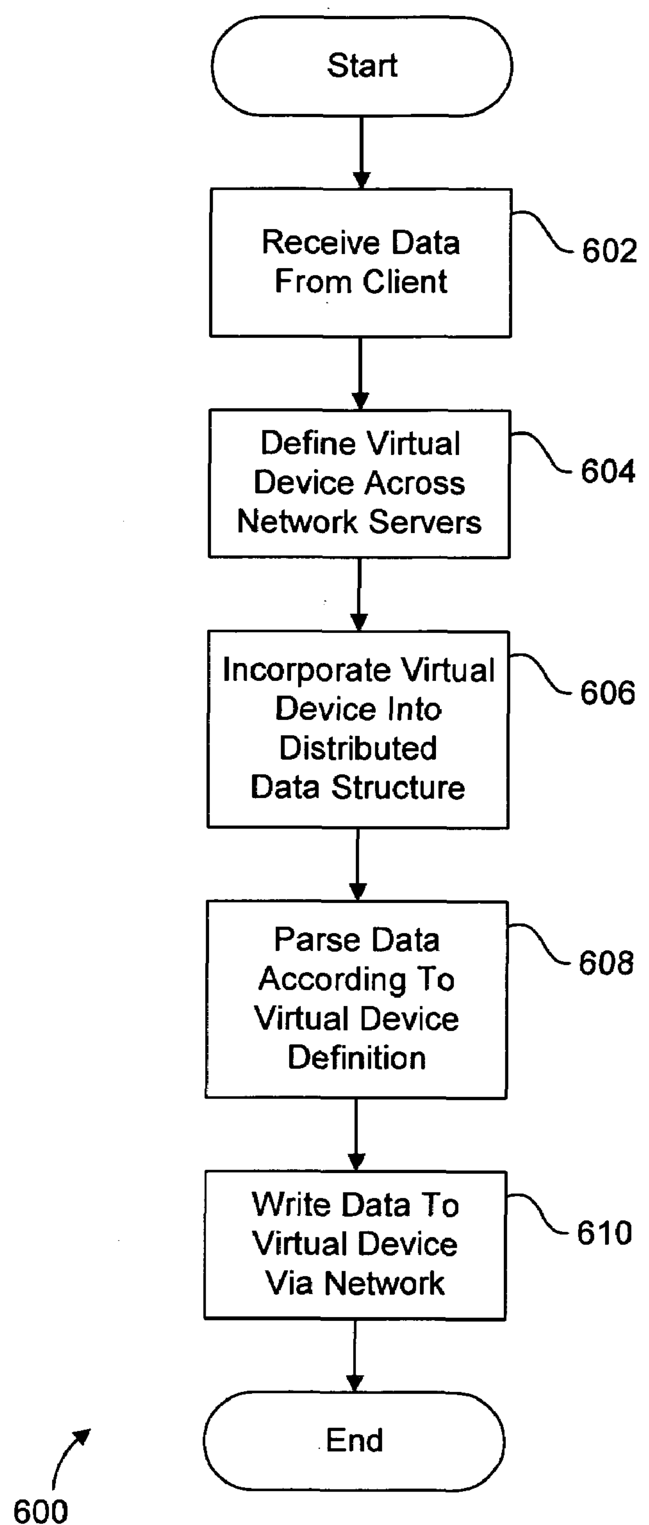
FIG. 6 is a flow chart summarizing a method of storing data, according to one particular embodiment of the present invention.

FIG. 6 is a flow chart summarizing a method 600 of storing data. In a first step 602, client interface 224 receives a data set (e.g., a word processing file) from a client (e.g., client 106(1)), along with an instruction to store the data. Then, in a second step 604, an LCC 220 defines a virtual device to store the received data. Next, in a third step 606, an LCC 220 incorporates the new virtual device into the distributed data structure of the system. Then, in a fourth step 608, LCC 220 parses the data set according to the virtual device definition. Finally, in a fifth step 610, LCC 220 writes the parsed data to the virtual device via the network 112 and I/O processes 218 (local and remote). Then method 600 ends. In one particular implementation, LCCs 220 operate according to instructions from client library 230.

Figure 7:
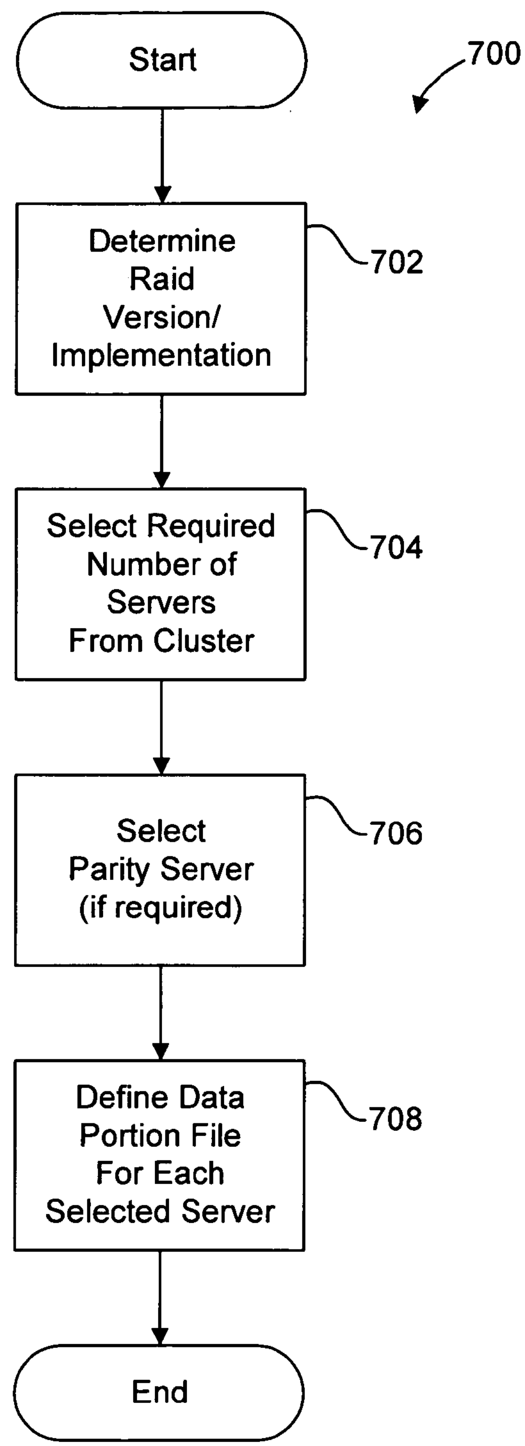
FIG. 7 is a flow chart summarizing a method of performing the "Define Virtual Device Across Network Servers" step of the method of FIG. 6, according to one particular embodiment of the present invention.

FIG. 7 is a flow chart summarizing one method 700 of performing the second step 604 of method 600. In a first step 702, LCC 220 determines the appropriate RAID implementation (e.g., based on the file name or suffix of the received data set, configuration parameters, etc.) to be used to store the data set. Next, in a second step 704, LCC selects which ones of servers 102(1-*m*) (e.g., based on available storage capacity, server status, etc.) will host the respective portions of the virtual device. Then, in a third step 706, LCC 220 selects a server to host a portion of the virtual device to store parity data, if the particular RAID scheme requires parity data. Finally, in a fourth step 708, LCC 220 defines a data portion file for each selected server, each data portion file serving as a portion of the virtual device.

Figure 8:
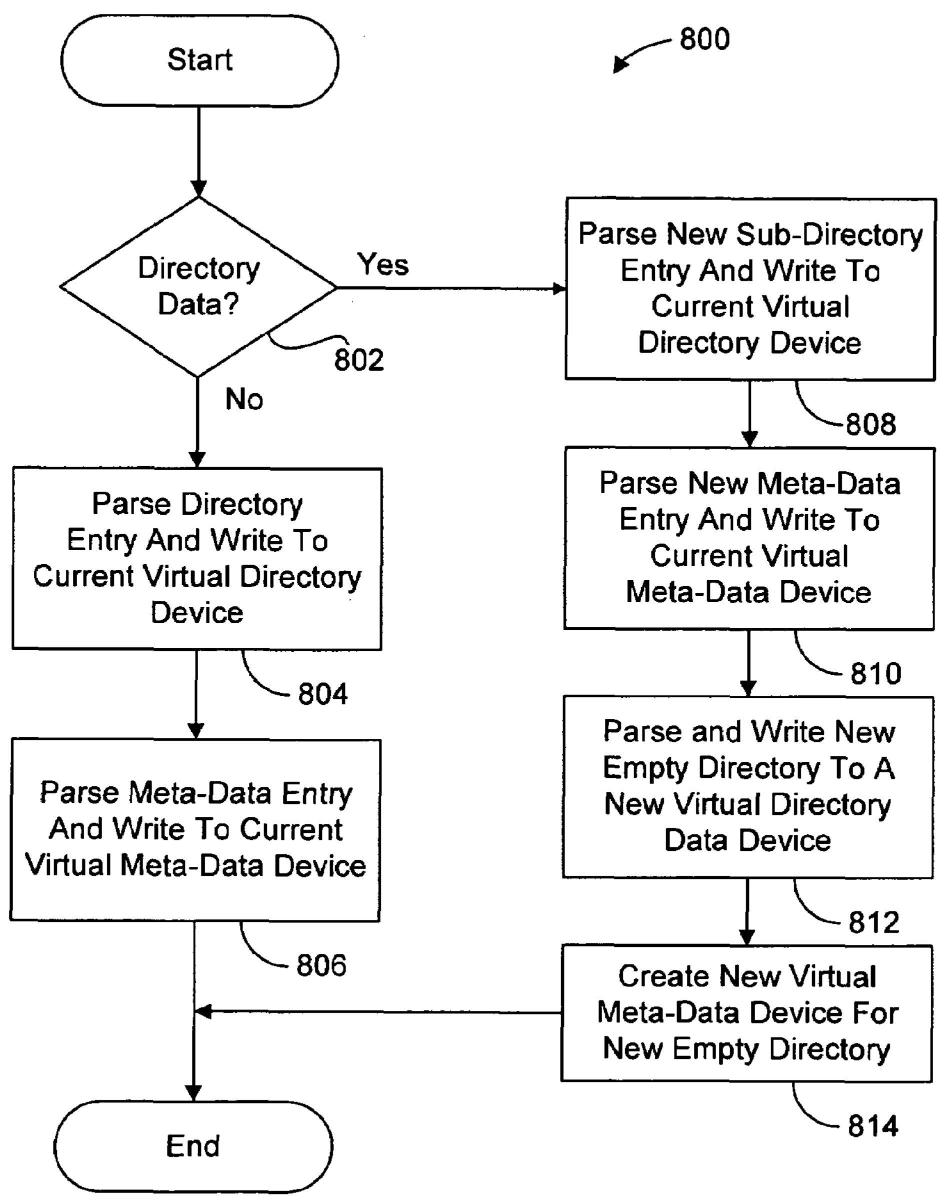
FIG. 8 is a flow chart summarizing a method of performing the "Incorporate Virtual Device Into Distributed Data Structure" step of the method of FIG. 6, according to one particular embodiment of the present invention.
Figure 9:
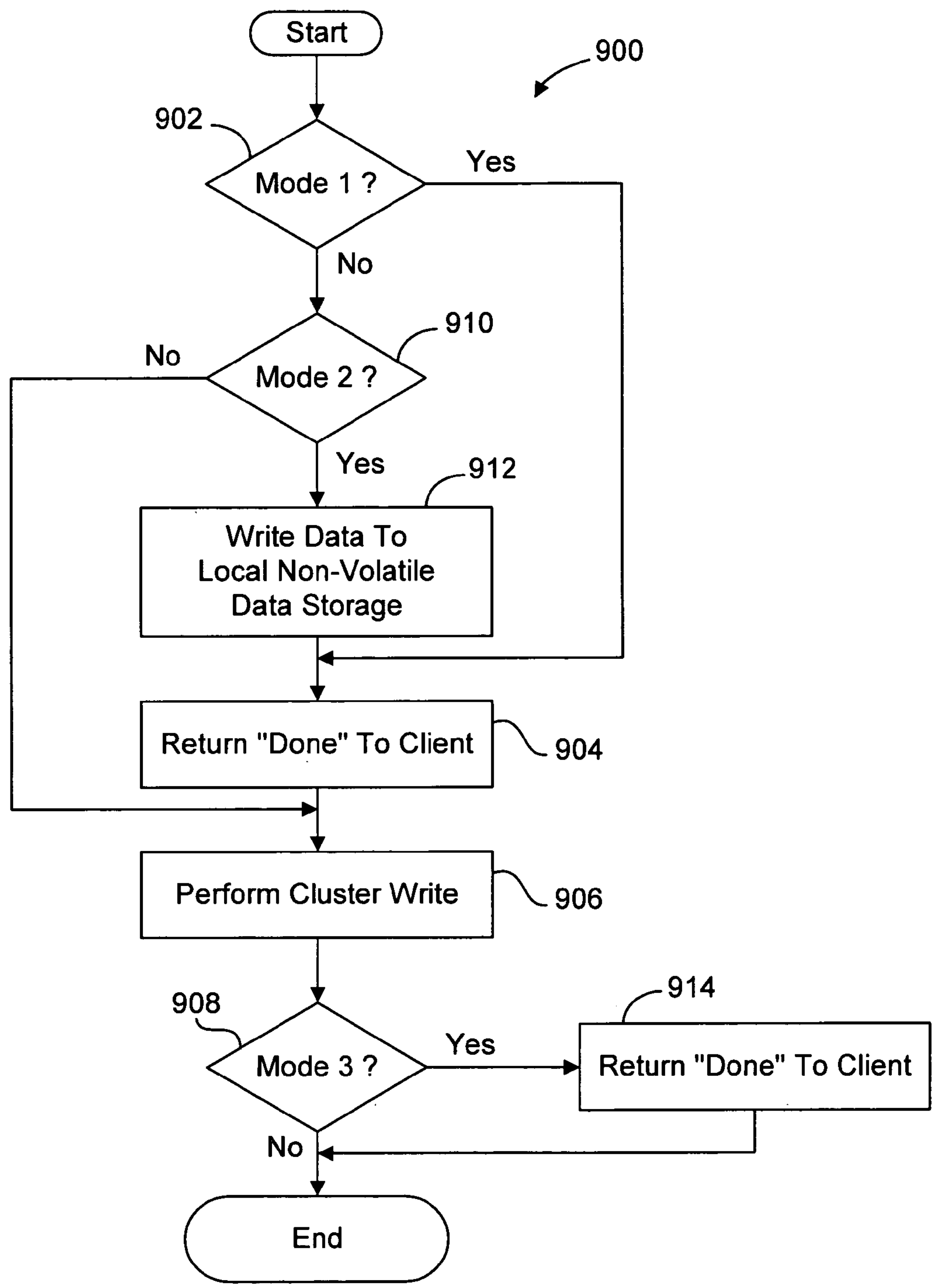
FIG. 9 is a flow chart summarizing a method of performing the "Write Data To Virtual Device Via Network" step of the method of FIG. 6, according to one particular embodiment of the present invention.

FIG. 8 is a flow chart summarizing one method 800 of performing the third step 606 of method 600. In a first step 802, LCC 220 determines whether the received data set is directory data or file data. If the data set is not directory data (i.e., the new virtual storage device is a file data device), then in a second step 804, LCC 220 parses a new directory entry for the data set and writes the parsed entry to the current virtual directory device. Then, in a third step 806, LCC 220 parses a new meta-data entry for the new data set, and writes the parsed meta-data entry to the current (identified in the directory entry) virtual meta-data device. Then method 800 ends.

If, in first step 802, LCC 220 determines that the data set includes directory data (i.e., a new sub-directory), then in a fourth step 808 LCC 220 parses a new sub-directory entry and writes the parsed entry to the current virtual directory device. Next, in a fifth step 810, LCC 220 parses and writes a new meta-data entry (for the new sub-directory) to the current virtual meta-data device. Then, in a sixth step 812, LCC 220 parses and writes a new empty directory to a new virtual directory data device, and in a seventh step 814 creates a new virtual meta-data device for the new empty directory. Then method 800 ends.

FIG. 900 is a flow chart summarizing one method 900 for performing the fifth step 610 writing the data set to the virtual device via the network. Data can be written to the virtual device under a plurality of different modes of operation. The mode under which the write operation is performed determines when the client 226 will be notified that the write operation is complete. Mode selection can be based on any useful criteria (e.g., file name extension, etc.), and is generally based on how critical the data set is.

In a first step 902, LCC 220 determines whether the data write is to be performed according to a first mode of operation. If so, then in a second step 904, LCC 220 returns a "done" signal to client 226 (via client interface 224 and network 110), indicating that the data set has been stored, even though the data set has not yet been written to the virtual device. Then in a third step 906, LCC 220 performs a cluster write to write the parsed data set to the virtual device on the network servers 102(1-*m*). Next, in a fourth step 908, LCC 220 will determine that the write is not being performed according to a third mode of operation, and method 900 ends.

If, in first step 902, LCC 220 determines that the data write is not to be performed according to the first mode of operation, then in a fifth step 910 LCC 220 determines whether the data write is to be performed under a second mode of operation. If so, then in a sixth step 912, LCC 220 writes the data set to local nonvolatile data storage (e.g., a hard disk) to secure the data. Optionally, LCC 220 writes an entry to one or more fact servers 206 (local and/or remote) to indicate that valid data resides on the local disk. After the data is written to the local non-volatile data storage, method 900 proceeds to second step 904, where LCC 220 notifies the client that the data has been successfully stored, and method 900 proceeds as described above.

If, in fifth step 910, LCC 220 determines that the data write is not to be performed according to the second mode of operation, then method 900 proceeds to third step 906, where LCC 220 performs the cluster write operation. Then, in fourth step 908, LCC 220 will determine that the write operation proceeded under the third mode of operation, and in a seventh step 914 will transmit a "done" signal to client 226. Then, method 900 ends.

Figure 10:
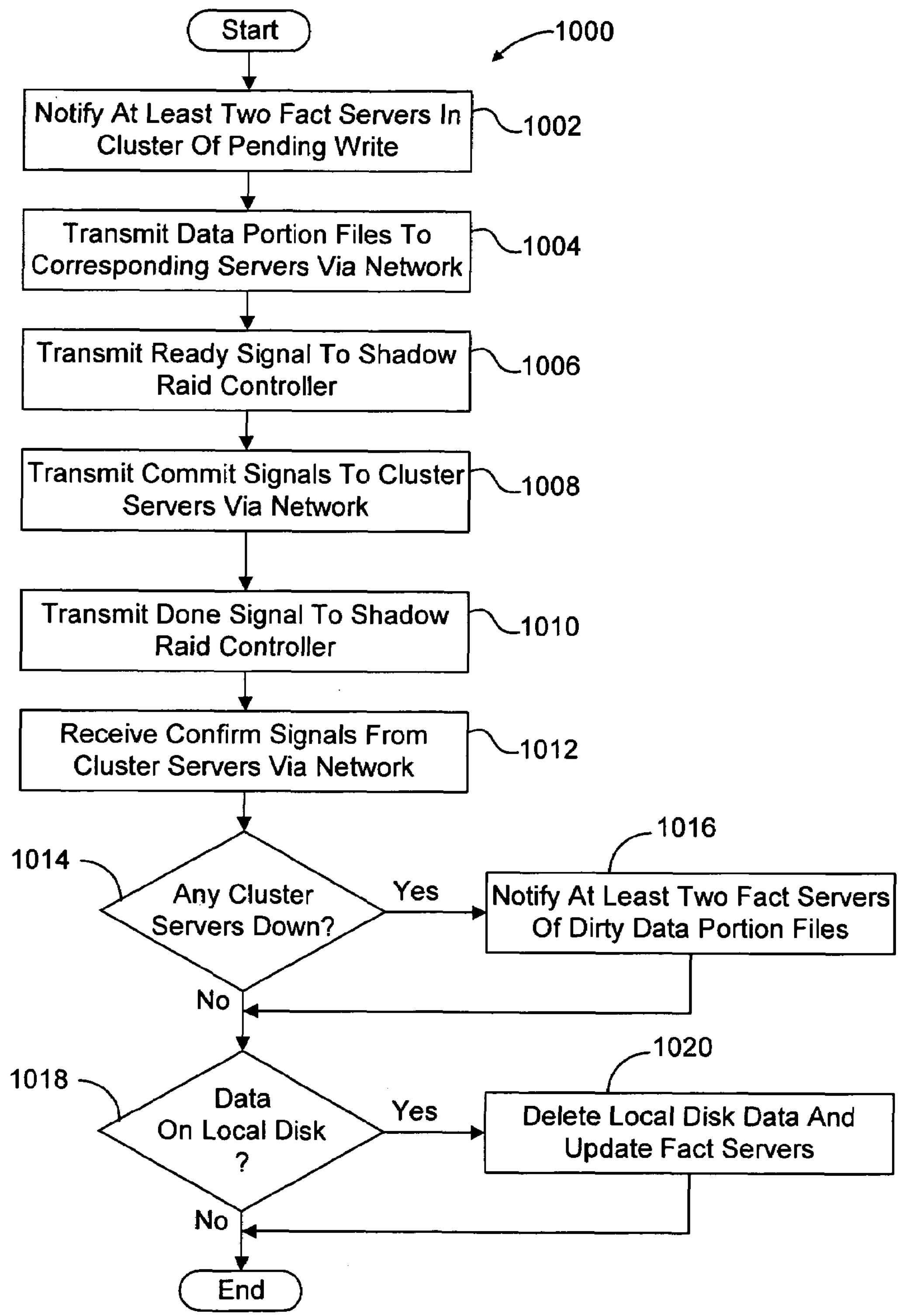
FIG. 10 is a flow chart summarizing a method for performing the "Perform Cluster Write" step of the method of FIG. 9, according to one particular embodiment of the present invention.

FIG. 10 is a flow chart summarizing one method 1000 of performing the third step 906 (cluster write) of method 900. In a first step 1002, LCC 220 notifies at least two fact servers 206 that a cluster write is pending. Then, in a second step 1004 LCC 220 transmits the data portion files to the corresponding ones of servers 102(1-*m*) via network 112. Then, in a third step 1006, LCC transmits a "ready" signal to a shadow RAID controller. Next, in a fourth step 1008, LCC 220 transmits "commit" signals to the cluster servers that cause the servers to commit there respective data portion files to memory. In a fifth step 1010, LCC 220 transmits a "done" signal to the shadow RAID controller. If the shadow controller receives the "ready" signal (step 1006) but does not receive the "commit" signal, the shadow controller will complete the cluster write by transmitting a commit signal to the cluster servers on behalf of LCC 220.

Next, in a sixth step 1012, LCC 220 receives confirmation signals from the cluster servers indicating that the data portion files have been committed to memory. Then, in a seventh step 1014, LCC 220 determines whether any of the cluster servers are down (e.g., no confirmation signal received). If so, in an eighth step 1016 LCC 220 notifies at least two fact servers that a portion (i.e., the portion file written to the down server) of the virtual device includes potentially corrupt data. Then, in a ninth step, 1018, LCC 220 determines whether the data set was previously written to local nonvolatile data storage (e.g., a mode 2 write). If so, then in a tenth step 1020, the data set is deleted from the local disk, and fact servers 206 are updated to indicate that the data is no longer stored on the local disk. Then method 1000 ends.

If, in seventh step 1014, LCC 220 determines that no cluster servers are down, then method 1000 proceeds directly to ninth step 1018. Similarly, if in ninth step 1018, LCC 220 determines that the data set is not stored in local nonvolatile data storage, then method 1000 ends.

Figure 11:
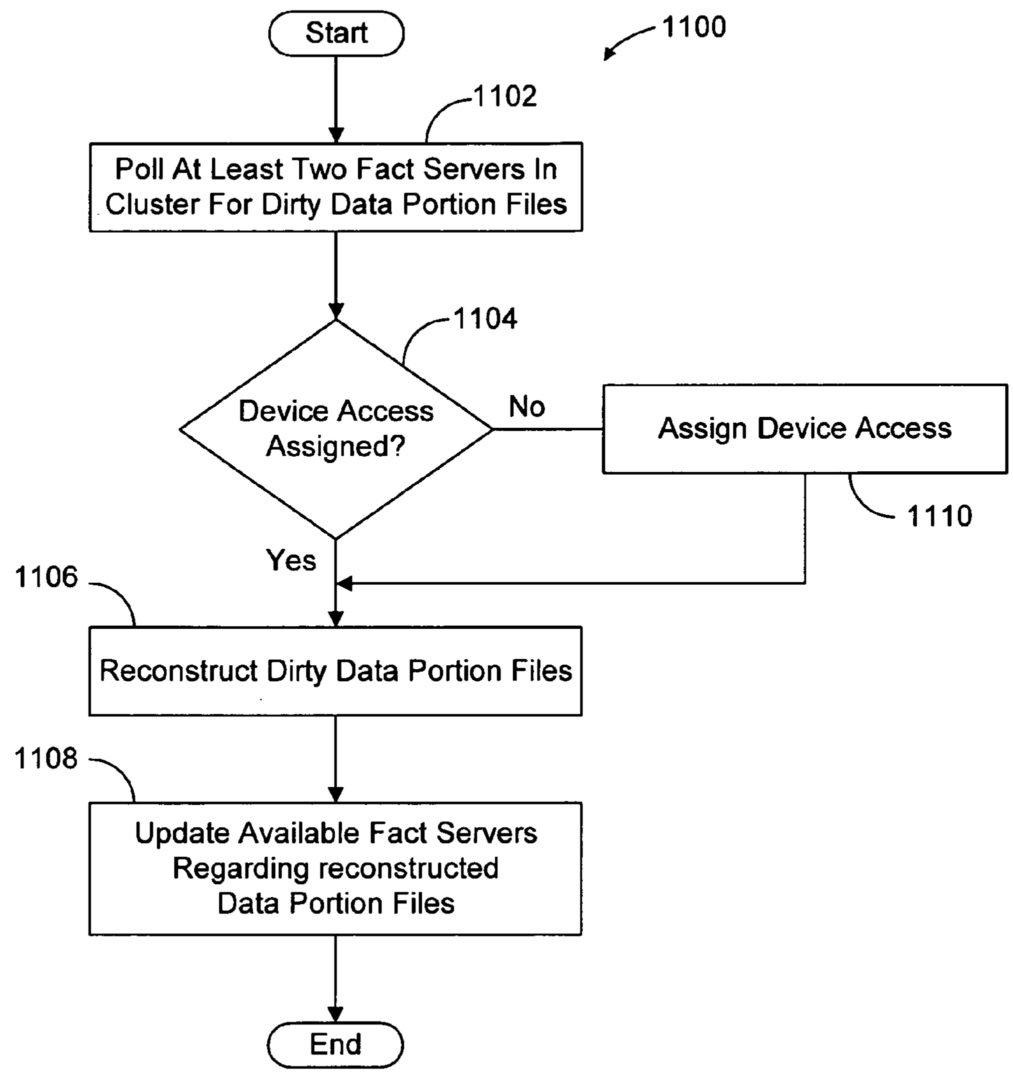
FIG. 11 is a flow chart summarizing a method for correcting corrupt data on cluster servers, according to one particular embodiment of the present invention.

FIG. 11 is a flow chart summarizing one method 1100 of correcting potentially corrupt data in virtual devices. The data reconstruction method can optionally be implemented at a number of different times. For example, the data reconstruction method may be periodically implemented by main controller 202 when the host server is first powered up. As another example, the data reconstruction method can be implemented by an LCC 220 when access to a virtual device is granted to the LCC. As yet another example, the data reconstruction method can be invoked via the admin process 212 to reconstruct data following a system failure.

For the sake of explanation, it will be assumed that method 1100 is implemented in a periodic polling process. In a first step 1102 the polling process polls at least two fact servers on servers 102(1-*m*) to identify potentially corrupt data portion files. In a second step 1104, the process determines whether access to the virtual device has been assigned to an LCC 220. If so, then in a third step 1106 the process instructs the LCC 220 with access to the virtual device to reconstruct (e.g., via parity data, locally stored data, etc.) the corrupt data. Virtually any known, or yet to be developed, data reconstruction technique can be implemented with method 1100. Next, in a fourth step 1108, the periodic polling process updates any available fact servers 206 to indicate that the corrupt data has been reconstructed.

If, in second step 1104, the polling process determines that access to the virtual device has not been granted, then in a fifth step 1110 the process invokes an LCC to register the virtual device, thereby gaining access to fix the potentially corrupt data. Then, method 1100 proceeds to third step 1106.

Figure 12:
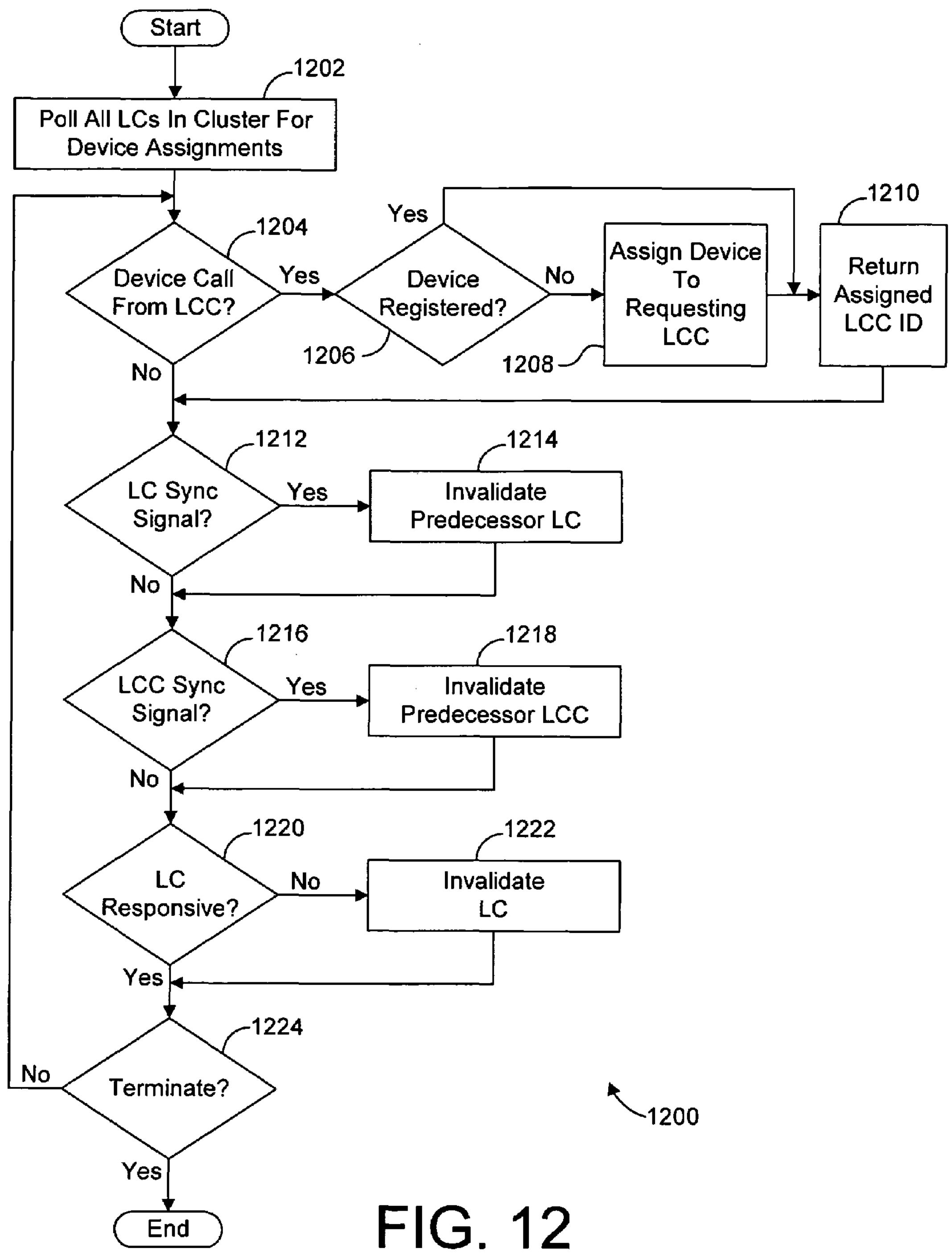
FIG. 12 is a flow chart summarizing a method for providing global control for cluster servers, according to one particular embodiment of the present invention.

FIG. 12 is a flow chart summarizing one method 1200 for controlling access to virtual devices on servers 102(1-*m*). In a first step 1202, the controlling process (e.g., global controller 210) polls all LCs 208 on the server cluster to determine which, if any, of the virtual devices have been assigned (registered) to any of LCCs 220 in the cluster. Then, in a second step 1204, the control process listens for a device call (lookup_or_register) from an LCC 220. If a device call is received, then in a third step 1206 the control process determines whether the device has already been registered to any of LCCs 220. If not, then in a fourth step

1208, the requested device is registered to the requesting LCC 220, and then in a fifth step 1210 the control process returns the ID of the LCC 220 to which the requested device is registered to the LCC requesting access. If, in third step 1206, the control process determines that the device was already registered to an LCC 220, then method 1200 proceeds directly to fifth step 1210.

If no device call is received in second step 1204, then method 1200 proceeds to a sixth step 1212, where the control process listens for an LC sync signal from any LC 208 in the cluster. An LC sync signal is generated each time an LC 208 starts up (e.g., when an unresponsive LC 208 is restarted). If an LC sync signal is received, then, in a seventh step 1214, responsive to the LC sync signal the control process invalidates the predecessor LC 208 (if any) to the newly starting LC 208, in order to free access to any devices registered to the predecessor LC 208. Then, devices can be registered to the newly started LC 208.

If no LC sync signal is received in sixth step 1212, then in an eighth step 1216, the control process listens for an LCC sync signal from any LCC 220 in the cluster. An LCC sync signal is generated each time an LCC 220 restarts. If an LCC sync signal is received, then, in a ninth step 1218, responsive to the LCC sync signal the control process invalidates any predecessor LCC 220 to the newly starting LCC 220.

If no LCC sync signal is received in eighth step 1216, then in a tenth step 1220, the control process determines whether any of LCs 208 have become unresponsive (e.g., via a signal from the operating system). If so, then in an eleventh step 1222, the control process invalidates the unresponsive LC and restarts another in its stead.

After either tenth step 1220 or eleventh step 1222, depending on whether there are any unresponsive LCs 208, in a twelfth step 1224 the control process determines whether method 1200 should terminate. If so, then method 1200 ends. If not, then method 1200 returns to second step 1204. Normally, method 1200 loops continually during operation.

Figure 13:
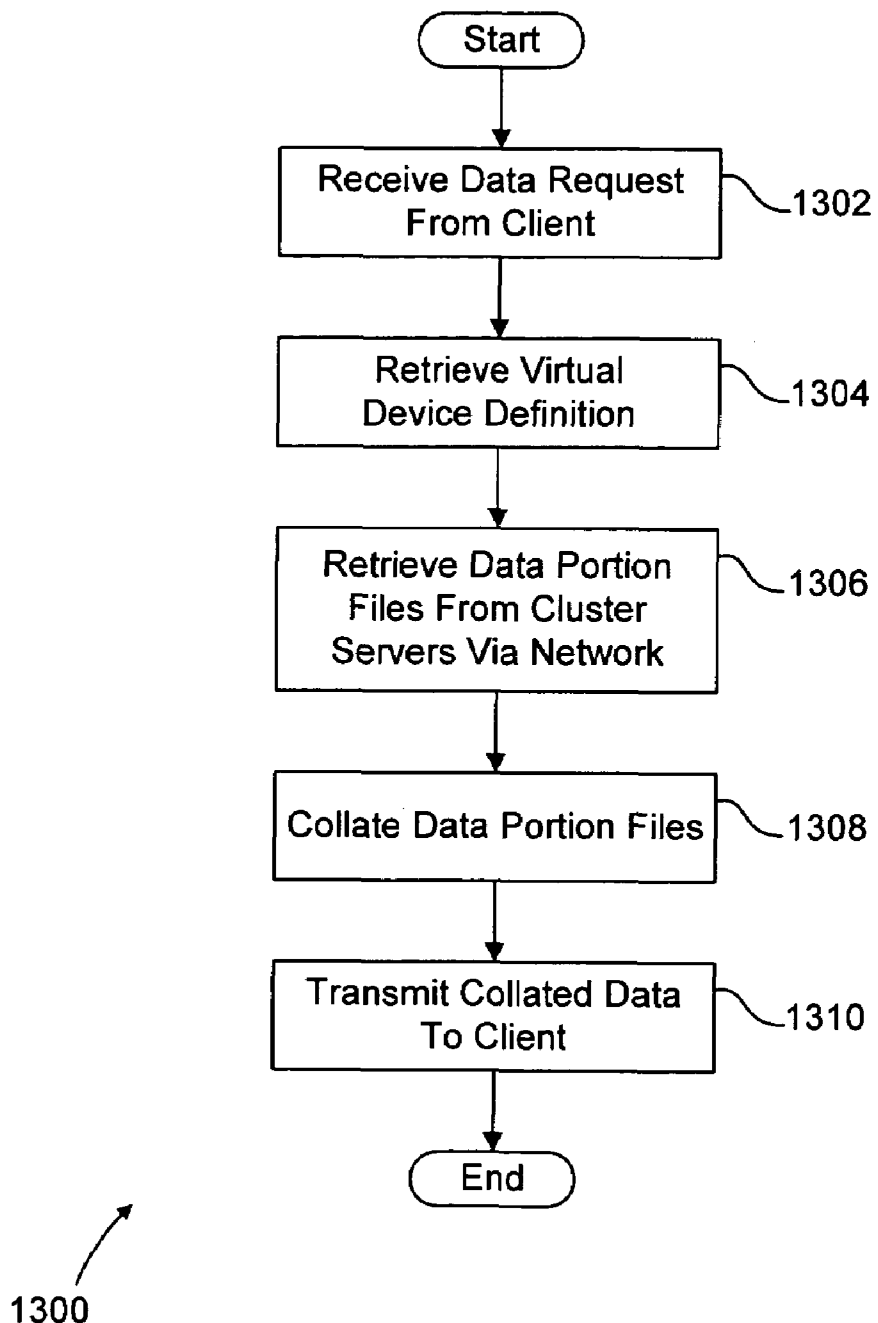
FIG. 13 is a flow chart summarizing a method of providing data stored on cluster servers to a client, according to one particular embodiment of the present invention

FIG. 13 is a flow chart summarizing one method 1300 for reading data from a virtual device. In a first step 1302, LCC 220 receives a data request from a client 226. Then, in a second step 1304, LCC 220 retrieves the virtual device definition (e.g., the portion file names, the corresponding servers, etc.) corresponding to the virtual device storing the requested data. Next, in a third step 1306, LCC 220 uses the virtual device definition to retrieve the data portion files from the corresponding cluster servers via network 112. Then, in a fourth step 1308 LCC 220 collates the data portion files to generate the requested data, and in a fifth step 1310 transmits the requested data to client 226 via network 110. Then method 1300 ends. As indicated above, in one particular implementation, LCCs 220 operate according to instructions from client library 230.

Figure 14:
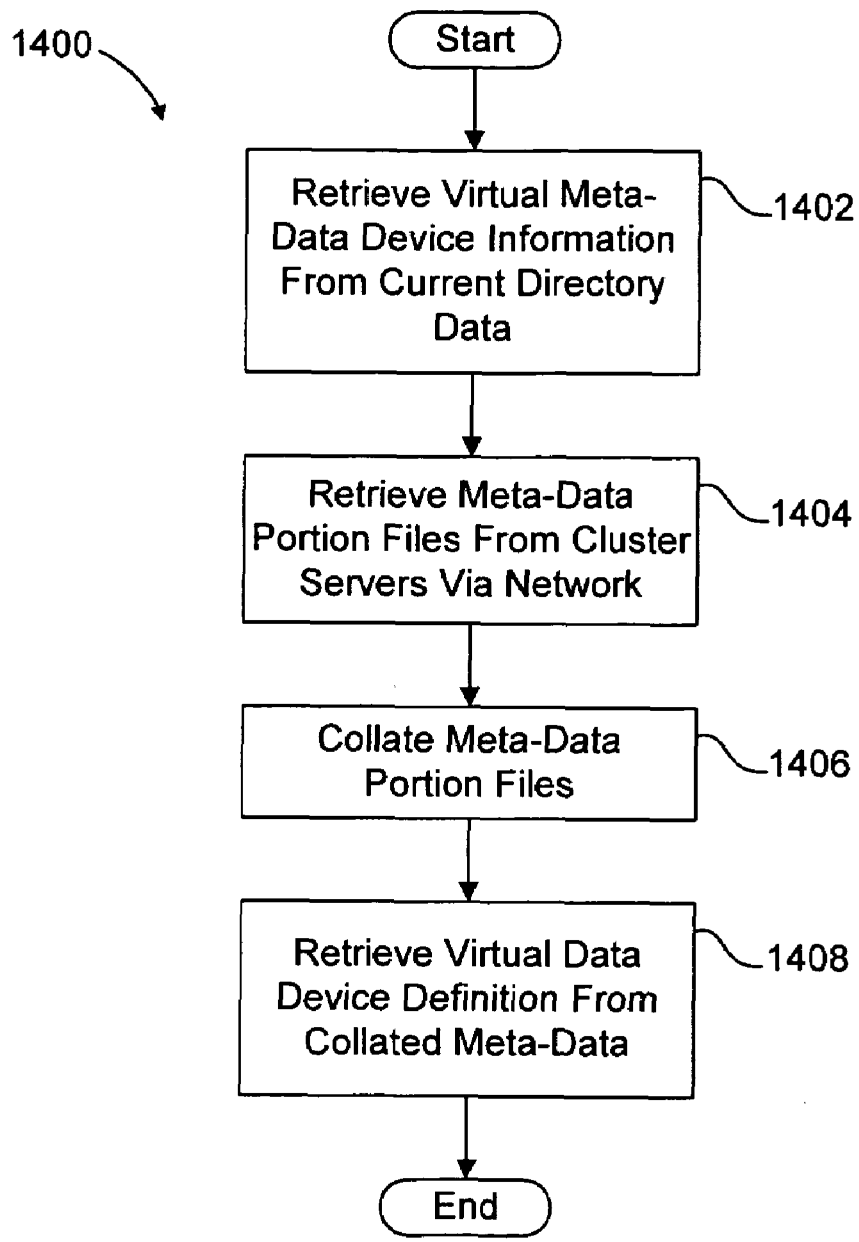
FIG. 14 is a flow chart summarizing a method of performing the "Retrieve Virtual Device Definition" step of the method of FIG. 13, according to one particular embodiment of the present invention.

FIG. 14 is a flow chart summarizing one method 1400 for performing second step 1304 =(retrieving the virtual device definition) of method 1300. In a first step 1402, LCC 220 retrieves the virtual meta-data device information from the current directory. Then, in a second step 1404, LCC 220 uses the meta-data device information to retrieve meta-data portion files (optionally via a different LCC) from corresponding ones of servers 102(1-*m*). Next, in a third step 1406, LCC 220 collates the meta-data portion files to generate the meta-data, and in a fourth step 1408 retrieves the virtual data device definition from the collated meta-data. Then method 1400 ends.

Figure 15:
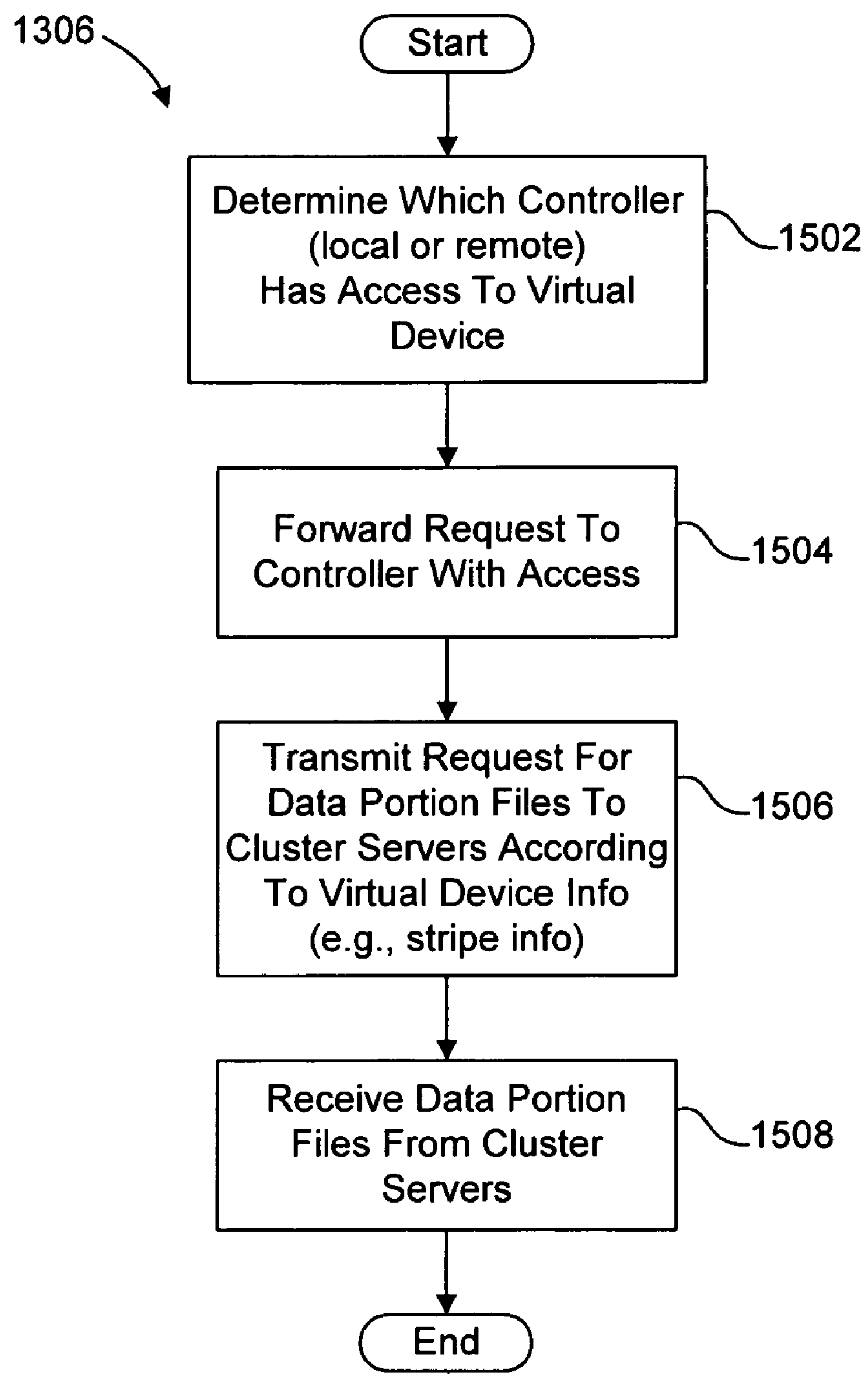
FIG. 15 is a flow chart summarizing a method of performing the "Retrieve Data Portion Files From Cluster Servers Via Network" step of the method of FIG. 13, according to one particular embodiment of the present invention.

FIG. 15 is a flow chart summarizing one method 1500 for performing the third step 1306 (retrieve data portion files) of method 1400. In a first step 1502, LCC 220 determines which LCC 220 (local or remote) has access to the virtual device storing the requested data. Next, in a second step 1504, LCC 220 forwards the data request to the LCC with access to the virtual device. Then, in a third step 1506, the LCC with access to the device transmits requests for the data portion files to the appropriate ones of cluster servers 102(1-*m*). Next, in a fourth step 1308, the LCC receives the requested data portion files from the cluster servers.

The description of particular embodiments of the present invention is now complete. Many of the described features may be substituted, altered or omitted without departing from the scope of the invention. For example, the present invention may be implemented in peer to peer networks as well as server based networks. Additionally, the invention could be used in applications other than file storage systems, for example as a highly reliable object request broker in a common object request broker architecture ("CORBA") system. As another example, the present invention may be implemented in hardware, software, firmware, or any combination thereof. As even yet another example, known or yet to be developed software components (e.g., communication protocols, operating systems, etc.) may be substituted for the analogous components disclosed herein. These and other deviations from the particular embodiments shown will be apparent to those skilled in the art, particularly in view of the foregoing disclosure.

We claim:

1. A data storage method comprising:

receiving a data set from a client;

defining a virtual device to include device portions on a plurality of network servers said step of defining said virtual device including determining the number of data portions into which said data set is to be parsed, selecting a number of servers from said plurality of servers corresponding to said number of data portions, and defining a data portion file for each selected server to store a corresponding one of said data portions;

parsing said data set into a plurality of data portions;

writing each of said data portions to a corresponding one of said device portions by transmitting each of said data portions to a corresponding one of said network servers as a corresponding one of said data portion files;

transmitting a commit signal to each of said corresponding network servers, said commit signals causing said network servers to commit said data portions to memory;

transmitting a ready signal to a backup controller after transmitting each of said data portions to a corresponding one of said network servers; and transmitting a done signal to said backup controller after transmitting said commit signals to said servers;

whereby said backup controller responsive to receiving said ready signal and not receiving said done signal, transmits a commit signal to said corresponding network servers.

2. A data storage method according to claim 1, wherein:

said data set is received from said client via a first network; and and said data portions are written to said device portions via a second network.

3. A data storage method according to claim 1, further comprising:

receiving additional data sets from additional clients;

defining additional virtual devices to include device portions on said plurality of network servers;

parsing each said additional data set into a plurality of data portions; and writing each of said data portions of said additional data sets to a corresponding one of said device portions of said additional virtual devices.

4. A data storage method according to claim 3, wherein no more than one user data file is written to each of said virtual devices.

5. A data storage method according to claim 3, wherein no more than one directory data file is written to each of said virtual devices.

6. A data storage method according to claim 3, wherein no more than one meta-data file is written to each of said virtual devices.

7. A data storage method according to claim 3, wherein each of said virtual devices contains no more than one type of data.

8. A data storage method according to claim 1, further comprising incorporating said virtual device into a data structure distributed across said plurality of network servers.

9. A data storage method according to claim 8, wherein said data set includes new directory data, and incorporating said device into said data structure includes:

parsing a new sub-directory entry;

writing said parsed subdirectory entry to a virtual directory device defined across said plurality of network servers, said virtual directory device corresponding to a current directory in which the new directory will be included;

parsing a new meta-data entry;

writing said parsed meta-data entry to a virtual meta-data device defined across said plurality of network servers, said virtual meta-data device corresponding to said current directory;

defining a new virtual directory device across said plurality of network servers;

parsing said new directory data;

writing said parsed new directory data to said new virtual directory device; and defining a new virtual meta-data device across said plurality of network servers.

10. A data storage method according to claim 8, wherein said data set includes new user file data, and incorporating said virtual device into said data structure comprises:

parsing a new file entry;

writing said parsed file entry to a virtual directory device defined across said plurality of network servers, said virtual directory device corresponding to a current directory in which the new file will be included;

parsing a new meta-data entry;

writing said parsed meta-data entry to a virtual meta-data device defined across said plurality of network servers, said virtual meta-data device corresponding to said W current directory.

11. A data storage method according to claim 1, wherein said number of data portions depends on the type of data set.

12. A data storage method according to claim 1, wherein each said data portion file is assigned a name, said name including:

an identifier uniquely identifying said virtual device;

a file number uniquely identifying said data portion file with respect to other data portion files corresponding to said virtual device; and the total number of said data portion files corresponding to said virtual device.

13. A data storage method according to claim 1, wherein:

said step of defining said virtual device includes defining one of said device portions to include parity data; and said step of parsing said data includes generating said parity data.

14. A data storage method according to claim 1, wherein said step of selecting a number of servers from said plurality of servers includes selecting said servers based at least in part on the available storage capacity of said servers.

15. A data storage method according to claim 1, further comprising transmitting a signal to said client indicating that said data set has been stored, after said data set has been received, but before said data set has been written to said virtual device.

16. A data storage method according to claim 1, further comprising:

writing said data set to local non-volatile memory; and transmitting a signal to said client indicating that said data set has been stored, after said data set has been written to said non-volatile memory, but before said data set has been written to said virtual device.

17. A data storage method according to claim 1, further comprising transmitting a signal to said client indicating that said data has been stored, only after said data set has been written to said virtual device.

18. A data storage method according to claim 1, further comprising transmitting a signal to said client indicating that said data has been stored, said signal being transmitted at one of the following times depending on a predetermined criteria;

after said data set has been received, but before said data set has been written to said virtual device;

after said data set has been written to local non-volatile memory, but before said data set has been written to said virtual device; or only after said data set has been written to said virtual device.

19. A data storage method according to claim 18, wherein said predetermined criteria includes a data type of said data set.

20. A data storage method according to claim 18, wherein said predetermined criteria includes a file name extension associated with said data set.

21. A data storage method according to claim 1 further comprising:

determining whether a confirmation signal has been received from each of said corresponding network servers, said confirmation signals indicating that said network servers have committed said data portions to memory; and writing a write failure entry to at least one fact server, said write failure entry identifying any of said corresponding network servers from which said confirmation signals are not received.

22. A data storage method according to claim 21, wherein said write failure entry is written to at least two fact servers.

23. A data storage method according to claim 22, wherein said fact servers each reside on a different one of said plurality of network servers.

24. A data storage method according to claim 22, further comprising:

periodically polling said fact servers;

correcting any data portion files corresponding to incomplete writes identified by said fact servers.

25. A data storage method according to claim 1, further comprising:

determining whether a confirmation signal has been received from each of said corresponding network servers, said confirmation signals indicating that said network servers have committed said data portions to memory; and writing a write failure entry to at least one fact server, said write failure entry identifying any of said corresponding network servers from which said confirmation signals are not received; and wherein said backup controller, responsive to receiving said ready signal and not receiving said done signal, performs said steps of determining whether said confirmation signals have been received and writing said write failure entry to said fact server.

26. A data storage method according to claim 25, wherein said write failure entry is written to at least two fact servers.

27. A data storage method according to claim 26, wherein said fact servers each reside on a different one of said plurality of network servers.

28. A data storage method according to claim 1, wherein said step of receiving said data set from said client comprises:

writing said data set to local nonvolatile data storage; and writing a local data entry to a fact server, said local data entry indicating that valid data is stored in said local nonvolatile data storage.

29. A data storage method according to claim 28, wherein said local data entry is written to at least two fact servers.

30. A data storage method according to claim 29, wherein said fact servers each reside on a different one of said plurality of network servers.

31. A data storage method according to claim 28, further comprising:

removing said data set from said local nonvolatile memory after said data set is written to said virtual device; and updating said fact server to indicate that said data set is no longer in said local nonvolatile data storage.

32. A data storage method according to claim 1, further comprising:

receiving a data request from a client;

retrieving a virtual device definition corresponding to the requested data, said virtual device definition identifying device portions located on a plurality of network servers;

retrieving data portion files from said device portions;

collating said retrieved data portion files to generate the requested data; and transmitting the requested data to said client.

33. A data storage method according to claim 32, wherein said step of retrieving said virtual device definition comprises:

retrieving virtual meta-data device information from a current directory;

retrieving meta-data portion files from said plurality of network servers;

collating said meta-data portion files to generate metedata; and retrieving said virtual device definition from said metedata.

34. A data storage method according to claim 32, wherein said step of retrieving data portion files from said device portions comprises:

transmitting requests for said data portion files to network servers corresponding to said device portions; and receiving said data portion files from said network servers.

35. A data storage method according to claim 34, wherein each said data portion file is assigned a name, said name including:

an identifier uniquely identifying the requested data;

a file number uniquely identifying said data portion file with respect to other data portion files corresponding to the data; and the total number of said data portion files corresponding to the requested data.

36. A data storage method according to claim 34, wherein said step of retrieving data portion files from said device portions comprises:

determining which one of a plurality of controllers has access to said virtual device, said controllers residing on said network servers; and invoking said controller with access to said virtual device to retrieve said data portion files.

37. A data storage method according to claim 36, wherein said step of retrieving said virtual device definition comprises:

determining which one of said plurality of controllers has access to another virtual device storing said virtual device definition; and invoking said controller with access to said another virtual device to retrieve said virtual device definition.

38. A data storage method according to claim 37, wherein said steps of determining which ones of said plurality of controllers have access to said virtual devices include selecting said controllers depending on the type of data stored in said virtual devices.

39. A data storage method according to claim 34, wherein;

said step of receiving said data portion files from said network servers includes receiving all but one of said data portion files; and said step of collating said data portion files includes generating said one data portion file based on parity data included in said received data portion files.

40. A data storage method according to claim 32, further comprising:

polling at least one fact server to determine whether said virtual device includes a potentially corrupt data portion file; and reconstructing said potentially corrupt data portion file.

41. A data storage method according to claim 32, further comprising:

polling at least one fact server to determine whether said virtual device includes a potentially corrupt data portion file;

polling at least one fact server to determine whether said requested data is stored in nonvolatile data storage; and retrieving said requested data from said nonvolatile data storage instead of said virtual device, if said virtual device includes a potentially corrupt data portion file and said requested data is stored in said nonvolatile data storage.

42. A data storage method according to claim 32, wherein:

communication with said client is via a first network; and communication with said network servers is via a second network.

43. A data storage method according to claim 42, wherein communication between said client and said network servers is via said first network.

44. A computer-readable medium having code embodied therein for causing an electronic device to perform the method of claim 1.

45. A computer-readable medium having code embodied therein for causing an electronic device to perform the method of claim 2.

46. A computer-readable medium having code embodied therein for causing an electronic device to perform the method of claim 3.

47. A computer-readable medium having code embodied therein for causing an electronic device to perform the method of claim 4.

48. A computer-readable medium having code embodied therein for causing an electronic device to perform the method of claim 5.

49. A computer-readable medium having code embodied therein for causing an electronic device to perform the method of claim 6.

50. A computer-readable medium having code embodied therein for causing an electronic device to perform the method of claim 7.

51. A computer-readable medium having code embodied therein for causing an electronic device to perform the method of claim 8.

52. A computer-readable medium having code embodied therein for causing an electronic device to perform the method of claim 9.

53. A computer-readable medium having code embodied therein for causing an electronic device to perform the method of claim 10.

54. A computer-readable medium having code embodied therein for causing an electronic device to perform the method of claim 11.

55. A computer-readable medium having code embodied therein for causing an electronic device to perform the method of claim 12.

56. A computer-readable medium having code embodied therein for causing an electronic device to perform the method of claim 13.

57. A computer-readable medium having code embodied therein for causing an electronic device to perform the method of claim 14.

58. A computer-readable medium having code embodied therein for causing an electronic device to perform the method of claim 15.

59. A computer-readable medium having code embodied therein for causing an electronic device to perform the method of claim 16.

60. A computer-readable medium having code embodied therein for causing an electronic device to perform the method of claim 17.

61. A computer-readable medium having code embodied therein for causing an electronic device to perform the method of claim 18.

62. A computer-readable medium having code embodied therein for causing an electronic device to perform the method of claim 19.

63. A computer-readable medium having code embodied therein for causing an electronic device to perform the method of claim 20.

64. A computer-readable medium having code embodied therein for causing an electronic device to perform the method of claim 21.

65. A computer-readable medium having code embodied therein for causing an electronic device to perform the method of claim 22.

66. A computer-readable medium having code embodied therein for causing an electronic device to perform the method of claim 23.

67. A computer-readable medium having code embodied therein for causing an electronic device to perform the method of claim 24.

68. A computer-readable medium having code embodied therein for causing an electronic device to perform the method of claim 25.

69. A computer-readable medium having code embodied therein for causing an electronic device to perform the method of claim 26.

70. A computer-readable medium having code embodied therein for causing an electronic device to perform the method of claim 27.

71. A computer-readable medium having code embodied therein for causing an electronic device to perform the method of claim 28.

72. A computer-readable medium having code embodied therein for causing an electronic device to perform the method of claim 29.

73. A computer-readable medium having code embodied therein for causing an electronic device to perform the method of claim 30.

74. A computer-readable medium having code embodied therein for causing an electronic device to perform the method of claim 31.

75. A computer-readable medium having code embodied therein for causing an electronic device to perform the method of claim 32.

76. A computer-readable medium having code embodied therein for causing an electronic device to perform the method of claim 33.

77. A computer-readable medium having code embodied therein for causing an electronic device to perform the method of claim 34.

78. A computer-readable medium having code embodied therein for causing an electronic device to perform the method of claim 35.

79. A computer-readable medium having code embodied therein for causing an electronic device to perform the method of claim 36.

80. A computer-readable medium having code embodied therein for causing an electronic device to perform the method of claim 37.

81. A computer-readable medium having code embodied therein for causing an electronic device to perform the method of claim 38.

82. A computer-readable medium having code embodied therein for causing an electronic device to perform the method of claim 39.

83. A computer-readable medium having code embodied therein for causing an electronic device to perform the method of claim 40.

84. A computer-readable medium having code embodied therein for causing an electronic device to perform the method of claim 41.

85. A computer-readable medium having code embodied therein for causing an electronic device to perform the method of claim 42.

86. A computer-readable medium having code embodied therein for causing an electronic device to perform the method of claim 43.

87. A data storage system comprising:

a network interface to facilitate communication with clients and with a plurality of network servers; and a file server, responsive to receiving a file to be stored from one of said clients, and operative to define a virtual device to include device portions on said plurality of network servers, to parse said file into a plurality of file portions, and to write each of said file portions to a corresponding one of said device portions, said file server including a client process for receiving said file from said client and a distribution controller, responsive to said client process, and operative to determine the number of file portions into which said file is to be parsed, to select a number of servers from said plurality of servers corresponding to said number of file portions, and to define a portion file for each selected server to store a corresponding one of said file portions; and an input/output process, responsive to receiving requests for locally stored portion files from said distribution controller, and operative to retrieve and transmit said portion files to said distribution controller; and wherein said distribution controller is further operative to transmit a commit signal to each of said corresponding network servers, said commit signals causing said network servers to commit said portion files to memory, to transmit a ready signal to a backup controller after transmitting each of said portion files to a corresponding one of said network servers, and to transmit a done signal to said backup controller after transmitting said commit signals to said servers;

whereby said back controller, responsive to receiving said ready signal and not receiving said done signal, transmits a commit signal to said corresponding network servers.

88. A data storage system according to claim 87, wherein said network interface comprises:

a first network adapter to facilitate communication between said data storage system and said clients; and a second network adapter to facilitate communication between said data storage system and said plurality of network servers.

89. A data storage system according to claim 87, further comprising a data storage device for storing at least one of said file portion, whereby said data storage system is capable of functioning as one of said plurality of network servers.

90. A data storage system according to claim 87, wherein said virtual device is limited to storing no more than on file.

91. A data storage system according to claim 87, wherein said distribution controller determines the number of file portions into which the file is to be parsed based, at least in part, on the file type of the file.

92. A data storage system according to claim 87, wherein said distribution controller is further operative to assign a name to each of said portion files, said name including:

an identifier uniquely identifying said file;

a file number uniquely identifying said portion file with respect to other portion files associated with said data set; and the total number of said portion files associated with said data set.

93. A data storage system according to claim 87, wherein said distribution controller is further operative to:

define an additional portion file to include parity data; and to generate said additional portion file from said portion files.

94. A data storage system according to claim 87, wherein said distribution controller is further operative to:

to determine the available storage on each of said plurality of servers; and to select servers from said plurality of servers based at least in part on the available storage capacity of said servers.

95. A data storage system according to claim 87, wherein said distribution controller is further operative to transmit a signal to said client indicating that said file has been stored, said signal being transmitted after said file has been received by said client process, but before said file has been written to said virtual device.

96. A data storage system according to claim 87, wherein said distribution controller is further operative to:

write said file to local non-volatile memory; and to transmit a signal to said client indicating that said file has been stored, after said file has been written to said non-volatile memory, but before said file has been written to said virtual device.

97. A data storage system according to claim 87, wherein said distribution controller is further operative to transmit a signal to said client indicating that said file has been stored, only after said file has been written to said virtual device.

98. A data storage system according to claim 87, wherein said distribution controller, responsive to predetermined criteria, is further operative to transmit a signal to said client indicating that said file has been stored, said signal being transmitted at one of the following times:

after said file has been received, but before said file has been written to said virtual device;

after said file has been written to local non-volatile memory, but before said file has been written to said virtual device; or only after receiving confirmation from said distribution controller that said file has been written to said virtual device.

99. A data storage system according to claim 98, wherein said predetermined criteria includes a file type of said file.

100. A data storage system according to claim 99, wherein said predetermined criteria includes a file name extension associated with said file.

101. A data storage system according to claim 87, wherein said distribution controller further is operative to:

determine whether a confirmation signal has been received from each of said corresponding network servers, said confirmation signals indicating that said network servers have committed said portion files to memory; and write a write failure entry to at least one fact server, said write failure entry identifying any of said corresponding network servers from which said confirmation signals are not received.

102. A data storage system according to claim 101, wherein said distribution controller is operative to write said write failure entry at least two fact servers.

103. A data storage system according claim 102, wherein:

said fact servers each reside on a different one of said plurality of network servers; and said data storage system further includes a fact server to receive entries from said network servers.

104. A data storage system according to claim 102, further comprising:

a local controller operative to poll said servers; and wherein, responsive to a signal from said local controller, said distribution controller is operative to correct any portion files corresponding to incomplete writes identified by said fact servers.

105. A data storage system according to claim 87, wherein said distribution controller is further operative to:

receive confirmation signals from each of said corresponding network servers, said confirmation signals indicating that said network servers have committed said portion files to memory; and write a write failure entry to at least fact server, said write failure entry identifying any of said corresponding network servers from which said confirmation signals are not received.

106. A data storage system according to claim 105, wherein said distribution controller is operative to write said write failure entries to at least two fact servers.

107. A data storage system according to claim 106, wherein said fact servers each reside on a different one of said plurality of network servers.

108. A data storage system according to claim 107, farther comprising:

a local controller operative to poll said fact severs; and wherein responsive to a signal from said local controller, said distribution controller is operative to correct any portion files corresponding to a write failure entry in at least one of said fact servers.

109. A data storage system according to claim 87, wherein said file server is operative to:

write said file to local nonvolatile data storage pending said write of said file portions to said device portions; and writing a local data entry to a fact server, said local data entry indicating that said file is stored in said local nonvolatile data storage.

110. A data storage system according to claim 109, wherein said local data entry is written to at least two fact servers.

111. A data storage system according to claim 110, wherein said fact servers each reside on a different one of said plurality of network servers.

112. A data storage system according to claim 109, wherein said file server is further operative to:

remove said file from said local nonvolatile memory after said file portions are written to said device portions; and update said fact server to indicate that said file is no longer in said local nonvolatile data storage.

113. A data storage system according to claim 87, further comprising:

a client interface operative to receive a file request from a client; and wherein said file server responsive to said file request is operative to retrieve a virtual device definition corresponding to said requested file, said virtual device definition identifying file portions located on a plurality of network servers, to retrieve said file portions, and to collate said retrieved file portions to generate said requested file.

114. A data storage system according to claim 113, wherein said client interface is further operative to transmit said requested file to said client.

115. A data storage system according to claim 114, wherein:

said file server includes a local controller responsive to said file request, and operative to retrieve virtual meta-data device information associated with said requested file from a current directory, said meta-data device information identifying meta-data device portions on said plurality of network servers; and said distribution controller responsive to said virtual meta-data device information, is operative to retrieve meta-data portion files from said meta-data device portions, to collate said meta-data portion files to generate meta data, said meta-data including said virtual device definition corresponding to said requested file.

116. A data storage system according to claim 114, wherein said distribution controller responsive to said virtual device definition is operative to transmit requests for said file portions to said servers, and to receive said file portions from said servers.

117. A data storage system according to claim 116, wherein said file portions are identified by a file portion name, said file portion name including:

an identifier uniquely identifying said requested file;

a second identifier uniquely identifying said file portion with respect to said other file portions corresponding to said requested file; and the total number of file portions corresponding to said requested file.

118. A data storage system according to claim 113, wherein said client interface, responsive to said file request, is operative to determine which of a plurality of controllers has access to said virtual device.

119. A data storage system according to claim 118, further comprising:

at least one of said plurality of controllers; and wherein at least one other of said plurality of controllers is located on one of said network servers of said plurality of network servers.

120. A data storage system according to claim 118, wherein which controller has access to said virtual device depends on the type of file stored in said virtual device.

121. A data storage system according to claim 120, wherein each of said controllers is able to handle only one type of file.

122. A data storage system according to claim 113, wherein said file server, responsive to receiving all but one of said file portion, is operative to generate said one file portion from parity data in one of said received file portions.

123. A data storage system according to claim 113, wherein:

said client interface communicates with clients via a first network; and said file server communicates with said plurality of network servers via a second network.

* * * * *